United States Patent
Miyazawa

(10) Patent No.: US 10,855,908 B2
(45) Date of Patent: Dec. 1, 2020

(54) DEVICE, METHOD, AND STORAGE MEDIUM FOR DETERMINING A FOCUS DIRECTION USING PHASE DIFFERENCE DETECTION IN FOCUS DETECTION REGIONS

(71) Applicant: Olympus Corporation, Hachioji (JP)

(72) Inventor: Shingo Miyazawa, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/509,316

(22) Filed: Jul. 11, 2019

(65) Prior Publication Data

US 2020/0045237 A1   Feb. 6, 2020

(30) Foreign Application Priority Data

Jul. 31, 2018 (JP) ................. 2018-143705

(51) Int. Cl.
*H04N 5/232* (2006.01)

(52) U.S. Cl.
CPC . *H04N 5/232122* (2018.08); *H04N 5/232123* (2018.08); *H04N 5/232127* (2018.08)

(58) Field of Classification Search
CPC ....... H04N 5/232122; H04N 5/232127; H04N 5/232123; H04N 5/23212
See application file for complete search history.

(56) References Cited

U.S. PATENT DOCUMENTS

| 10,326,954 | B2* | 6/2019 | Yamamura | ......... H04N 5/23212 |
| 2016/0212323 | A1 | 7/2016 | Ishii | |
| 2017/0104944 | A1 | 4/2017 | Kikuchi et al. | |
| 2017/0264842 | A1* | 9/2017 | Yamamura | ........... H04N 5/3696 |

FOREIGN PATENT DOCUMENTS

JP   2015-005853 A   1/2015

* cited by examiner

*Primary Examiner* — Nicholas G Giles
(74) *Attorney, Agent, or Firm* — John C. Pokotylo; Pokotylo Patent Services

(57) ABSTRACT

A focus control device, comprising an image sensor capable of generating a phase difference detection signal, a focus detection region setting circuit that sets a plurality of focus detection regions having at least some parts in common, in a region of the image sensor that receives the light flux, an AF control circuit comprising a first calculation section that calculates a first focus direction based on a phase difference detection signal from a first focus detection region, and a second calculation section that is capable of detecting a larger focus deviation amount than a focus deviation amount that can be detected by the first calculation section, and calculates a second focus direction based on a phase difference detection signal from a second focus detection region, and a controller that determines focus direction in which to perform focus adjustment based on the first focus direction and the second focus direction.

19 Claims, 16 Drawing Sheets

FIG. 8

| RANGING RESULT | DIRECTION DETERMINATION RESULT |
|---|---|
| RANGING NOT POSSIBLE | INDETERMINATE |
| WITHIN ±1F$\delta$ | IN-FOCUS |
| LARGER THAN +1F$\delta$ | CLOSE RANGE |
| SMALLER THAN −1F$\delta$ | INFINITY |

FIG. 10

| | NORMAL CORRELATION DIRECTION DETERMINATION RESULT | | | | | EXTENDED CORRELATION DIRECTION DETERMINATION | OVERALL PHASE DIFFERENCE DIRECTION DETERMINATION RESULT |
|---|---|---|---|---|---|---|---|
| | CLOSE RANGE | IN-FOCUS | INFINITY | INDETERMINATE | RETAIN | | |
| A1 | O | — | — | — | — | — | CLOSE RANGE |
| A2 |  | O | — | — | — | — | IN-FOCUS |
| A3 |  |  | O | — | — | CLOSE RANGE | CLOSE RANGE |
| A4 |  |  | O | — | — | OTHER | INFINITY |
| A5 | × | × | × | O | — | CLOSE RANGE | CLOSE RANGE |
| A6 |  |  | × | O | — | OTHER | INDETERMINATE |
| A7 |  |  |  | × | O | CLOSE RANGE | CLOSE RANGE |
| A8 |  |  |  | × | O | OTHER | RETAIN |

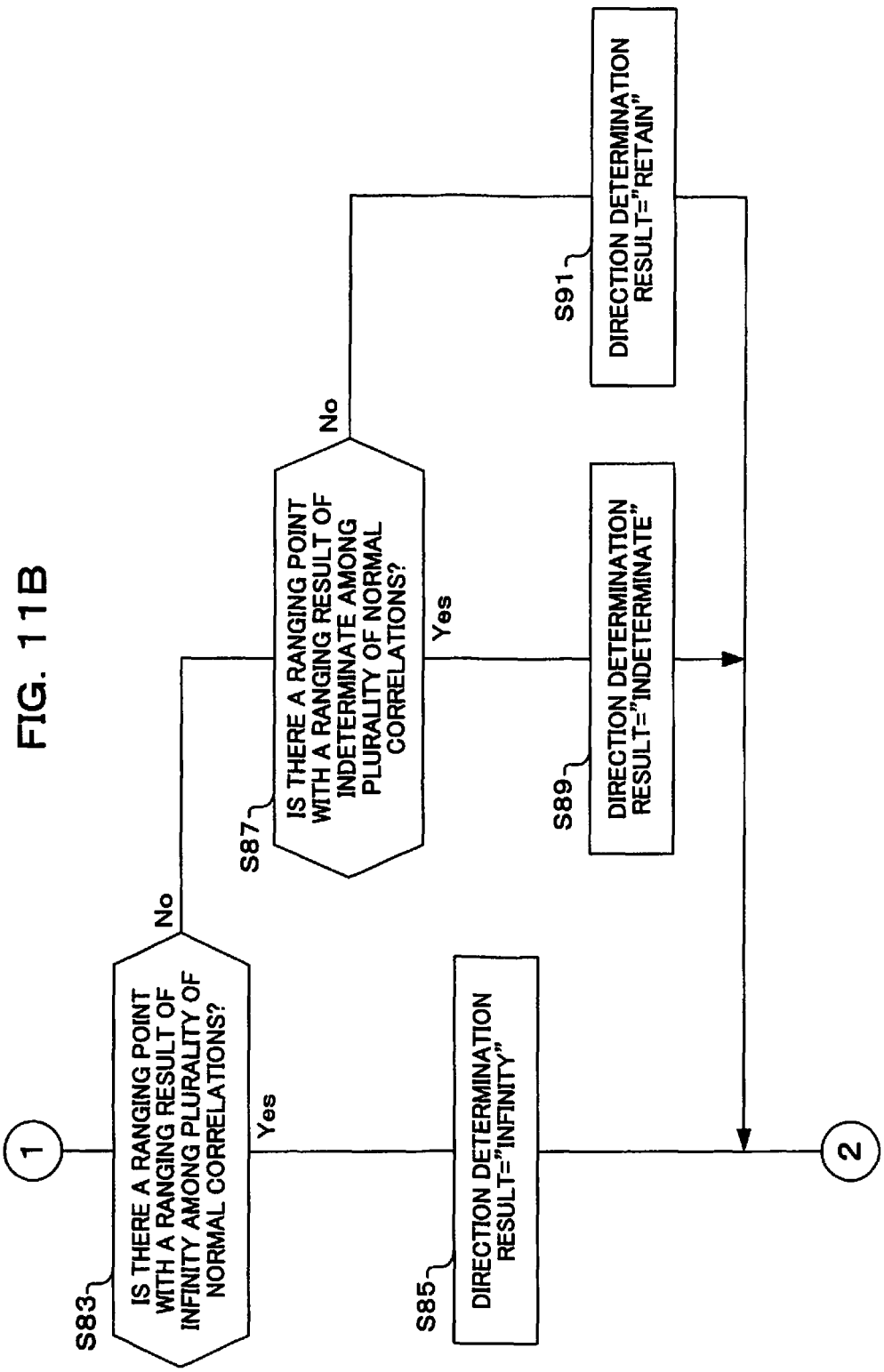

FIG. 12

| | n | n+1 | n+2 | n+3 | n+4 | n+5 | n+6 | n+7 | n+8 |
|---|---|---|---|---|---|---|---|---|---|
| PREVIOUS DIRECTION DETERMINATION RESULT | Near | Far | Far | Far | Far | Far | Far | Near | Near |
| CURRENT DIRECTION DETERMINATION RESULT | Far | Far | Far | Far | Far | Far | Near | Near | IN-FOCUS |
| RETENTION DETERMINATION COUNTER | 0 | 1 | 2 | 3 | 4 | 5 | 0 | 1 | 0 |
| FINAL DIRECTION DETERMINATION RESULT | RETAIN | RETAIN | RETAIN | Far | Far | Far | RETAIN | RETAIN | IN-FOCUS |
| VALID DEFOCUS AMOUNT | MAINTAIN | MAINTAIN | MAINTAIN | UPDATE | UPDATE | UPDATE | MAINTAIN | MAINTAIN | MAINTAIN |

| | DIRECTION DETERMINATION RESULT | | FINAL DIRECTION DETERMINATION RESULT |
|---|---|---|---|
| | PHASE DIFFERENCE | CONTRAST AF | |
| B1 | CLOSE RANGE | — | CLOSE RANGE |
| B2 | INFINITY | — | INFINITY |
| B3 | else | CLOSE RANGE | CLOSE RANGE |
| B4 | | INFINITY | INFINITY |
| B5 | | INDETERMINATE | INDETERMINATE |

FIG. 18

| | NORMAL CORRELATION RANGING RESULT | DETERMINATION USING CONTRAST | EXTENDED CORRELATION RANGING RESULT | LENS DRIVE STATE | step DRIVE AMOUNT |
|---|---|---|---|---|---|
| C1 | SMALLER THAN 5Fδ | — | — | — | 0.5Fδ |
| C2 | SMALLER THAN 10Fδ | — | — | — | 2Fδ |
| C3 | GREAT THAN OR EQUAL TO 10Fδ | — | — | — | 4Fδ |
| C4 | ELSE (RANGING NOT POSSIBLE) | CLOSE TO IN-FOCUS | — | — | 0.5Fδ |
| C5 | | ELSE | WITHIN 5Fδ | — | 1Fδ |
| C6 | | | DEFOCUS FROM 5Fδ | — | 4Fδ |
| C7 | | | ELSE (RANGING NOT POSSIBLE) | DRIVE IS CONTINUING IN ONE DIRECTION | GRADUALLY INCREASE TO 4Fδ |
| C8 | | | | ELSE | 1Fδ |

DEVICE, METHOD, AND STORAGE MEDIUM FOR DETERMINING A FOCUS DIRECTION USING PHASE DIFFERENCE DETECTION IN FOCUS DETECTION REGIONS

CROSS-REFERENCE TO RELATED APPLICATIONS

Benefit is claimed, under 35 U.S.C. § 119, to the filing date of prior Japanese Patent Application No. 2018-143705 filed on Jul. 31, 2018. This application is expressly incorporated herein by reference. The scope of the present invention is not limited to any requirements of the specific embodiments described in the application.

BACKGROUND OF THE INVENTION

1. Field of the Invention

The present invention relates to a focus control device that is provided with a phase difference detection system focus detection device, a focus control method, and a storage medium.

2. Description of the Related Art

An imaging device such as a camera is provided with a focus control device that automatically focuses on a subject within a photographing screen. Since a plurality of subjects exist within the photographing screen, then even if there is a subject that is a mix of near and far objects it is desirable to focus on a main subject within that. There have therefore been various proposals to divide a focus detection region within the photographing screen into a plurality of regions, perform focus detection in respective focus detection regions, and perform focusing based on a plurality of focus detection results. For example, Japanese patent laid-open No. 2016-133674 (hereafter referred to as "patent publication 1") discloses a focus control device in which a focus detection area is divided into a plurality of areas, an average value of defocus amount for each area is calculated, and focusing of a photographing lens is performed using this value.

Because, with the focus control device disclosed in patent publication 1, the defocus amount is averaged, it is not possible to focus on a subject that is closest within a focus detection area. Generally, it is often the case that the closest subject is a main subject, and in this case a subject that is not the intended subject of the photographer is focused on. Also, since averaging processing computation takes time, this focus control device cannot track change in subject distance rapidly. Further, this focus control device effectively disregards ranging data that is far from an average value of ranging information within a focus detection area, and cannot secure followability with respect to a moving subject. Also, while this focus control device proposes broadening of a phase difference detection region at the time of low brightness or local contrast, it does not propose combination with contrast AF.

SUMMARY OF THE INVENTION

The present invention provides a focus control device and focus control method that can appropriately focus even on a subject that has a mix of near and far objects, and that has high followability and stability with respect to a subject that is moving.

A focus control device of a first aspect of the present invention comprises an image sensor capable of generating a phase difference detection signal by receiving light flux that passes through a photographing lens, a focus detection region setting circuit that sets a plurality of focus detection regions having at least some parts in common, in a region of the image sensor that receives the light flux, an AF control circuit comprising a first calculation section that calculates a first focus direction using phase difference detection based on a phase difference detection signal from a first focus detection region among the plurality of focus detection regions, and a second calculation section that is capable of detecting a larger focus deviation amount than a focus deviation amount that can be detected by the first calculation section, and calculates a second focus direction using phase difference detection based on a phase difference detection signal from a second focus detection region among the plurality of focus detection regions, and a controller that determines focus direction in which to perform focus adjustment based on the first focus direction and the second focus direction.

A focus control method of a second aspect of the present invention is a focus control method for a focus control device that has an image sensor capable of generating an image signal and a phase difference detection signal by receiving light flux that as passed through a photographing lens, that sets a plurality of focus detection regions having at least some parts in common, in a region of the image sensor that receives the light flux, and executes focus adjustment based on the image signal and the phase difference detection signal, the focus control method comprising calculating a first focus direction by phase difference detection based on a phase difference detection signal from a first focus detection region among the plurality of focus detection regions, calculating a second focus direction using phase difference detection based on a phase difference detection signal from the second focus detection region among the plurality of focus detection regions, it being possible, in the second focus detection region, to detect a larger focus deviation amount than a focus deviation amount that can be detected by phase difference detection based on a phase difference detection signal of the first focus detection region, and determining focus direction in which to perform focus adjustment based on the first focus direction and the second focus direction.

A non-transitory computer-readable medium storing a processor executable code of a third aspect of the present invention, which when executed by at least one processor, performs a focus adjustment method, the processor being arranged within a focus control device that has an image sensor capable of generating an image signal and a phase difference detection signal by receiving light flux that has passed through a photographing lens, that sets a plurality of focus detection regions having at least some parts in common, in a region of the image sensor that receives the light flux, and executes focus adjustment based on the image signal and the phase difference detection signal, the focus control method comprising: calculating a first focus direction by phase difference detection based on a phase difference detection signal from a first focus detection region among the plurality of focus detection regions; calculating a second focus direction by being able to detect a larger focus deviation amount than a focus deviation amount that can be detected by phase difference detection based on a phase difference detection signal of the first focus detection region, using phase difference detection based on a phase difference detection signal from the second focus detection region among the plurality of focus detection regions, and determining focus direction in which to perform focus adjustment based on the first focus direction and the second focus direction.

BRIEF DESCRIPTION OF THE DRAWINGS

FIG. 8 is a table showing determination of indeterminate, infinity, in-focus, and close range based on ranging result, in the camera of one embodiment of the present invention.

FIG. 10 is a table showing determination of infinity, in-focus, close range, indeterminate and retain based on ranging result for normal correlation and extended correlation, in the camera of one embodiment of the present invention.

FIG. 11A and FIG. 11B are flowcharts showing operation of phase difference direction determination, in the camera of one embodiment of the present invention.

FIG. 12 is a table showing a processing example for a case where retention determination processing is performed for phase difference direction determination overall, in the camera of one embodiment of the present invention.

FIG. 18 is a table for describing step drive amount, in the camera of one embodiment of the present invention.

DETAILED DESCRIPTION OF THE PREFERRED EMBODIMENTS

An example where the present invention is adopted in a digital camera (referred to as a "camera") as one embodiment of the present invention will be described in the following. This camera has an image sensor, with a subject image being converted to an image signal by image pixels of this image sensor, and the subject image being subjected to live view display on a display section arranged on the rear surface of the camera body or within a viewfinder based on this converted image signal. A photographer determines composition and photo opportunity by looking at the live view display. At the time of a release operation image data is stored in a storage medium. Image data that has been stored in the storage medium can be subjected to playback display on the display section if playback mode is selected.

Also, focus detection pixels are arranged on the image plane of the image sensor at specified intervals. The focus detection pixels are pixels for performing focus detection using so-called phase difference AF, and output focus detection signals. Specifically, within light flux that is passed through the photographing lens, the focus detection pixels only receive light flux from a specified direction among a right direction and left direction (or top direction and bottom direction etc.), and by calculating a phase difference between signals based on light flux of this direction and another direction it is possible to obtain a defocus amount for the photographing lens.

Also, an image signal is output from image pixels provided on the image plane of the image sensor, and image processing for live view display and for a storage image is applied. A contrast value (focus evaluation value) is also calculated using the image signal, and focus adjustment of the photographing lens is performed based on this contrast value. That is, with this embodiment, focus adjustment by contrast AF that is performed using an image signal, and focus adjustment by phase difference AF using a focus detection signal, are possible.

With this embodiment, further, first focus detection areas, and second focus detection areas, that include focus detection pixels of a wider range than the first focus detection areas, are provided using the plurality of focus detection pixels. Focus direction in which to perform focus adjustment is determined using ranging results with a focus detection signal from focus detection pixels within the first focus detection area, and ranging results with a focus detection signal from focus detection pixels within the second focus detection area. Further, focus direction in which to perform focus adjustment is determined also using ranging results with contrast AF.

Figure 1:
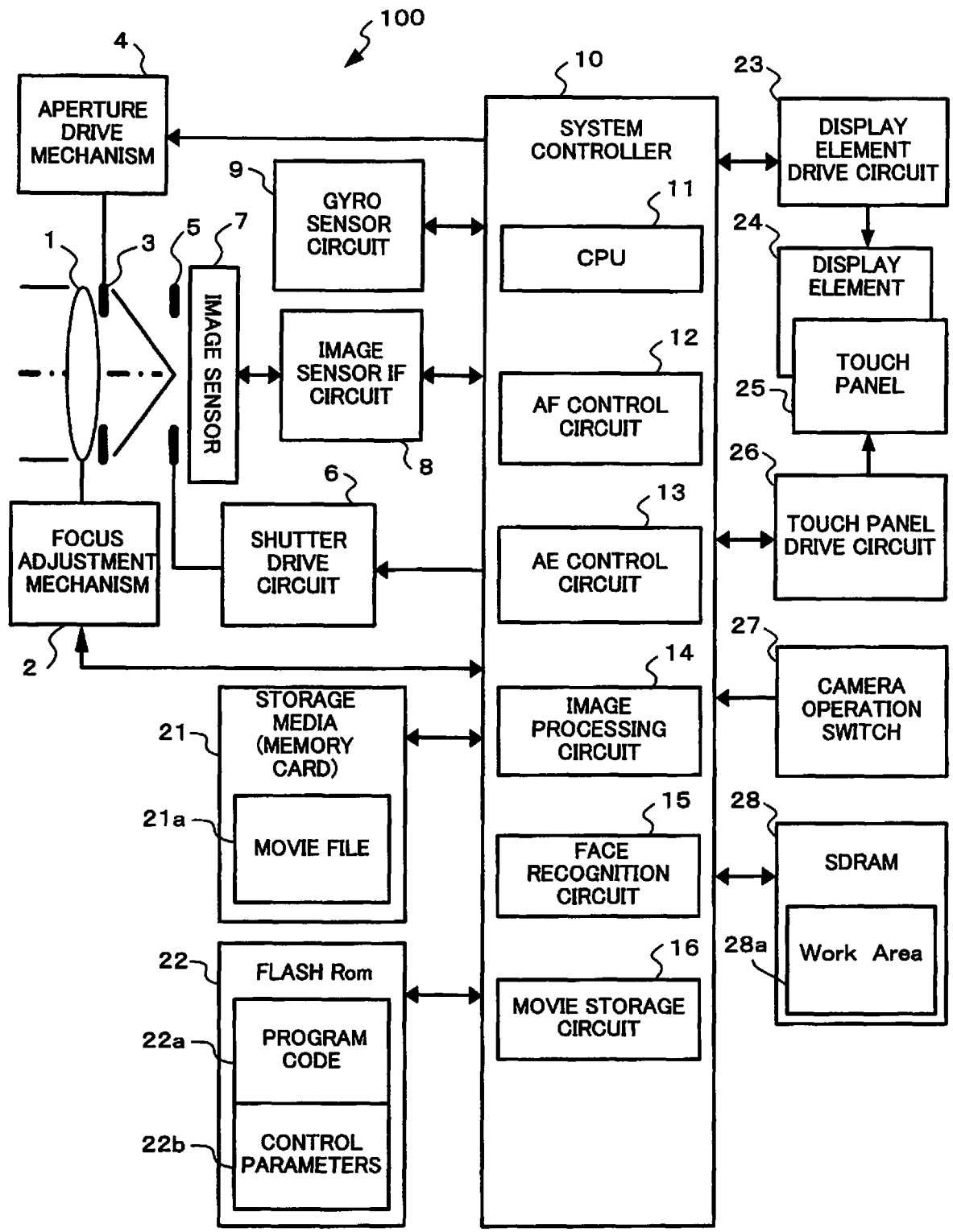
FIG. 1 is a block diagram mainly showing the electrical structure of a camera of one embodiment of the present invention.

FIG. 1 is a block diagram mainly showing the electrical structure of a camera 100 of this embodiment. The photographing lens 1 is comprised of a plurality of optical lenses including a focus lens, and forms a subject image. The photographing lens 1 may also have a zoom lens for changing focal length. The focus lens is capable of moving in the optical axis direction using a focusing mechanism 2. The focusing mechanism 2 includes a lens drive motor, a lens drive mechanism, and a lens drive circuit etc., and moves the focus lens to perform focusing based on control signals from a system controller 10.

An aperture 3 is arranged on the optical axis of the photographing lens 1, and has opening diameter changed by an aperture drive mechanism 4. By changing the opening diameter of the aperture 3, it is possible to change amount of light flux that passes through the photographing lens 1. The aperture drive mechanism 4 includes an aperture drive motor (or actuator), an aperture drive mechanism, an aperture drive circuit etc., and performs control of an aperture value based on control signals from the system controller 10.

A shutter 5 is arranged on the optical axis of the photographing lens 1, and opening and closing of the shutter is performed using a shutter drive circuit 6. Specifically, if the shutter 5 is closed subject light flux to the image sensor 7 is shut off, while if the shutter 5 is open subject light flux is guided to the image sensor 7. When performing live view display and movie shooting, the shutter 5 is set to open. Also, when performing still picture shooting, after a shutter has been temporarily closed, it is opened for an exposure time corresponding to shutter speed, and once the exposure time has elapsed the shutter 5 is closed. The shutter drive circuit 6 performs opening and closing control of the shutter 5 based on control signals from the system controller 10.

The image sensor 7 is a CCD (Charge Coupled Device) or CMOS (Complementary Metal-Oxide-Semiconductor) image sensor etc. The image sensor 7 has a pixel section with image pixels and focus detection pixels arranged two-dimensionally. Image pixels subject a subject image that has been formed by the photographing lens 1 to photoelectric conversion using photodiodes, and generate a photoelectric conversion signal (image signal). Also, focus detection pixels respectively subject light flux that has passed through different regions of a photographing lens 1 to photoelectric conversion using photodiodes, and generate a photoelectric conversion signal (focus detection signal). It should be noted that image pixels and focus detection pixels may also be shared. Specifically, a single pixel section is constructed by arranging a single microlens and a pair of two photodiodes for this microlens, output of one or both of the pair of photodiodes is made output of focus detection pixels, while output of both photodiodes of the pair may be added and made output for an image pixel (refer, for example, Japanese patent laid-open No. 2015-005853).

Also, with this embodiment contrast AF is performed based on output of an image signal from image pixels, and phase difference AF is performed based on a focus detection signal of focus detection pixels. Regarding focus detection areas for phase difference AF there are first focus detection areas for normal correlation calculation, and second focus detection areas that have a wider range of phase difference detection range than the first focus detection areas. Also, focus detection areas for contrast AF are called third focus detection areas. These focus detection areas will be described later using FIG. 2.

The image sensor 7 functions as an image sensor that is capable of generating an image signal and a phase difference detection signal by receiving light flux that has passed through a photographing lens. The camera 100 functions as a focus control device that executes focus adjustment based on the image signal and the phase difference detection signal. The image sensor 7 functions as an image sensor having image pixels that receive light flux that has passed through the photographing lens and output an image signal, and phase difference detection pixels that output a phase difference detection signal. The image sensor 7 has a first focus detection region, and this first focus detection region has a plurality of separate regions (refer, for example, to the first focus detection area 31 in FIG. 2).

The image sensor 7 performs accumulation and readout operations of the photoelectric conversion signal using an image sensor IF (interface) circuit 8. The image sensor IF circuit 8 executes imaging control of the image sensor 7 based on control signals from the system controller 10, subjects a photoelectric conversion signal that has been read out to AD conversion, and outputs this photoelectric conversion signal that has been subjected to AD conversion to the system controller 10.

Figure 2:
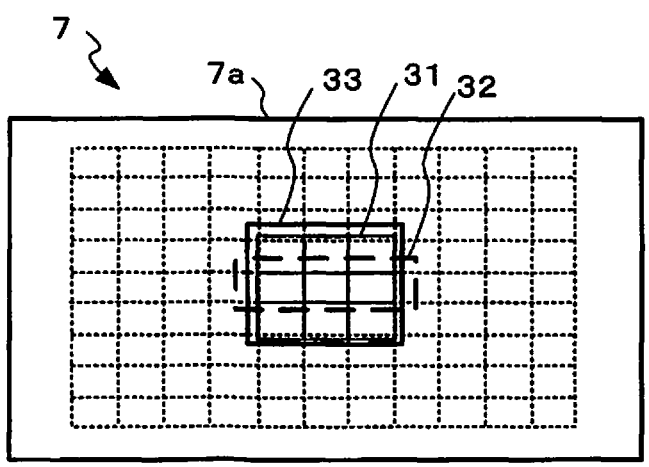
FIG. 2 is a drawing showing arrangement of focus detection areas of an image plane of a camera of one embodiment of the present invention.

The image sensor IF circuit 8 works in cooperation with the CPU 11 within the system controller 10, and functions as a focus detection region setting circuit (focus detection region setting section) that sets a plurality of focus detection regions, at least some of these regions being shared, in a region of the image sensor that receive light flux (refer, for example, to the first focus detection region 31 in FIG. 2). The focus detection region setting circuit may also be configured so as to be implemented using only the image sensor IF circuit 8 or only the CPU 11. The focus detection region setting circuit sets a plurality of individual areas within the first focus detection region (refer, for example, to the first focus detection region 31 in FIG. 2). It should be noted that with this embodiment the image sensor IF circuit 8 sets the focus detection regions, but the focus detection regions may also be set by another processor such as the CPU 11. In this case, the processor, such as the CPU 11, functions a focus detection region setting circuit.

The image sensor 7 is arranged on the optical axis of the imaging optical system (photographing lens 1), at a position that is behind the shutter 5, and where light flux from a subject is formed into an image by an imaging optical system. The image sensor 7 also generates a focus detection signal for calculating defocus amount of the photographing optical system, together with generating an image signal for a subject by forming an image of the subject.

A gyro sensor circuit 9 has gyro sensors for detecting orientation of the camera 100, and vibrations applied to the camera 100. A gyro sensor circuit 9 subjects detection signals from the gyro sensors to AD conversion, and then outputs converted signals to the system controller 10. When movie AF is being performed, when change in conditions of the camera 100 has been detected based on detection signals from the gyro sensor circuit 9, there is a transition to a control phase (refer to FIG. 3). Also, the image sensor 7 or the photographing lens 1 are driven based on detection signals of the gyro sensor circuit 9 so as to reduce camera shake of the camera 100.

The system controller 10 comprises a CPU (Central Processing Unit) 11, AF (Auto Focus) control circuit 12, AE (Auto Exposure) control circuit 13, image processing circuit 14, facial recognition circuit 15 and movie storage circuit 16. The system controller may be constructed integrally as an ASIC (Application Specific Integrated Circuit), and may be constructed using a plurality of processors.

The CPU 11 performs control of each section and each circuit within the camera 100, and performs overall control of the camera, based on program code 22*a* that has been stored in the flash ROM 22.

Figure 4:
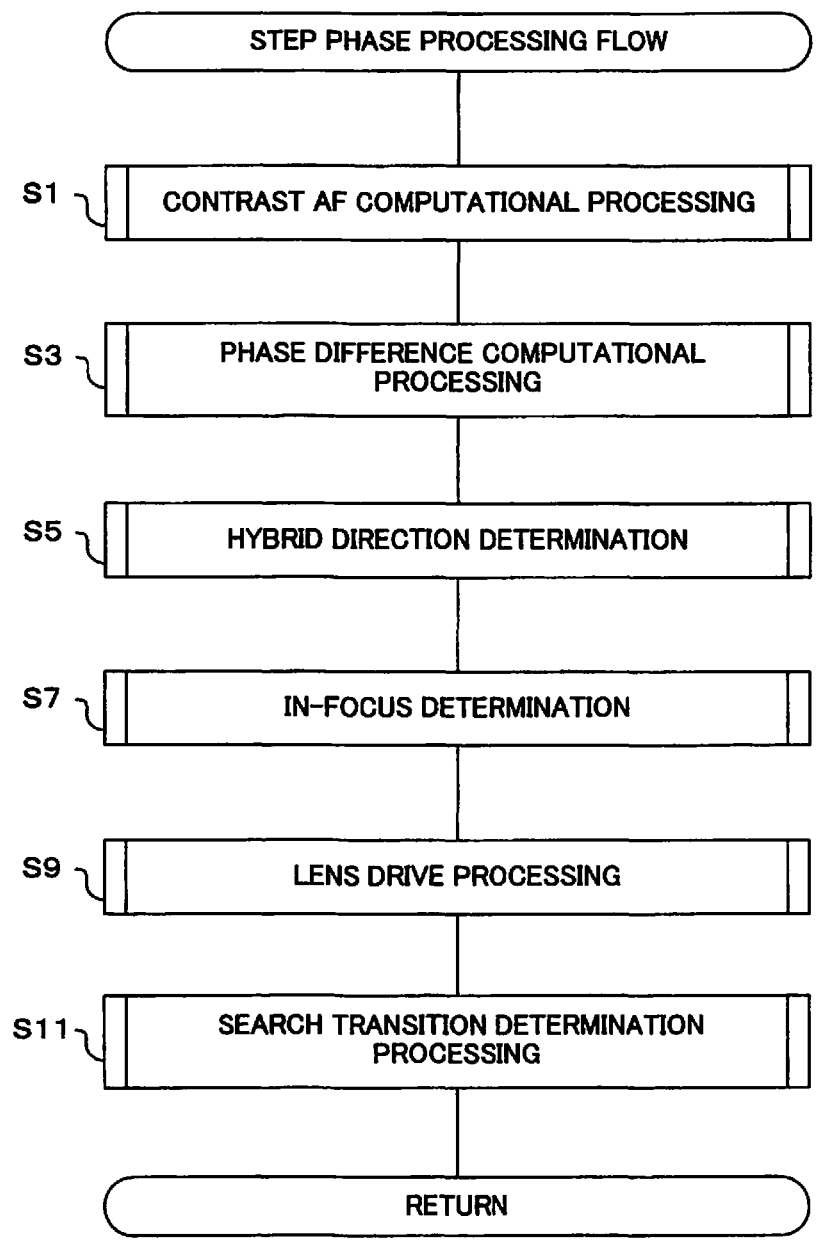
FIG. 4 is a flowchart showing operation of step phase processing, in the camera of one embodiment of the present invention.
Figures 14, 15:
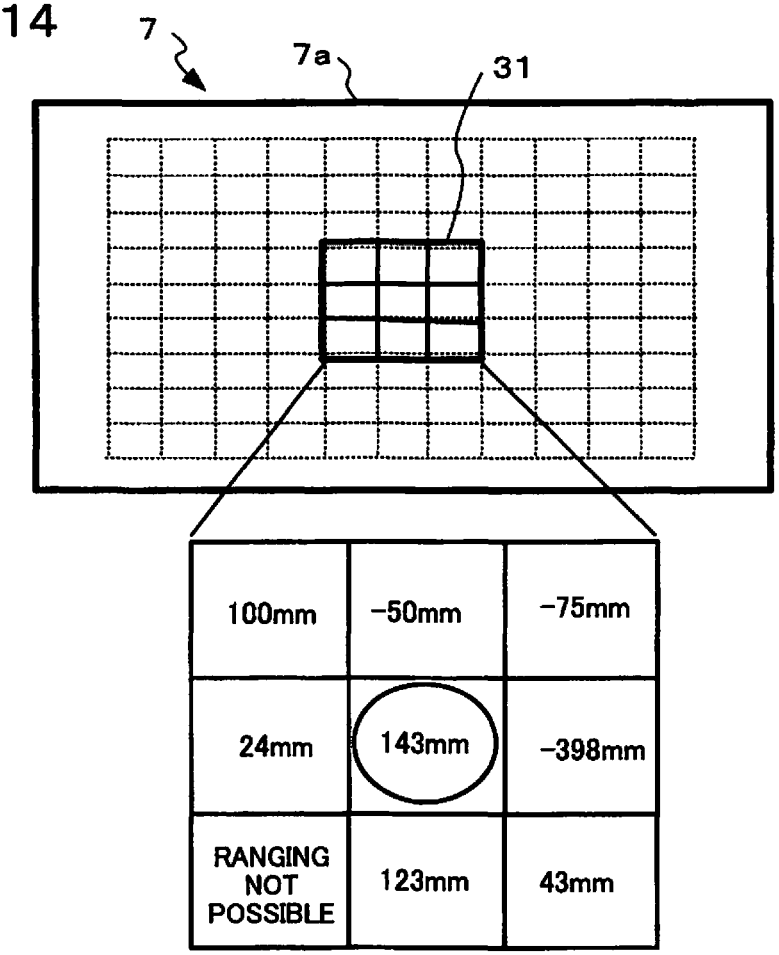
FIG. 14 is a drawing for describing defocus amount selection, in the camera of one embodiment of the present invention.
FIG. 15 is a table for describing hybrid direction determination, in the camera of one embodiment of the present invention.

The CPU 11 functions as a controller (control section) that determines focus direction in which to perform focus adjustment based on a first focus direction and a second focus direction (refer, for example, to S5 in FIG. 4, and to FIG. 15). The controller (control section) determines a focus direction in which to perform focus adjustment to be towards the close-range side if, for individual areas within a plurality of first focus detection regions, any one of a plurality of first focus directions that have been respectively calculated results in close-range side (refer, for example, to A1 in FIG. 10, and S71 and S73 in FIG. 11A), and determines a focus direction in which to perform focus adjustment to be towards the close-range side if, with all of the plurality of first focus directions not indicating close-range side, a second focus direction indicates close-range side (refer, for example, to A3, A5 and A7 in FIG. 10, and S79 and S81 in FIG. 11A).

Figure 11A:
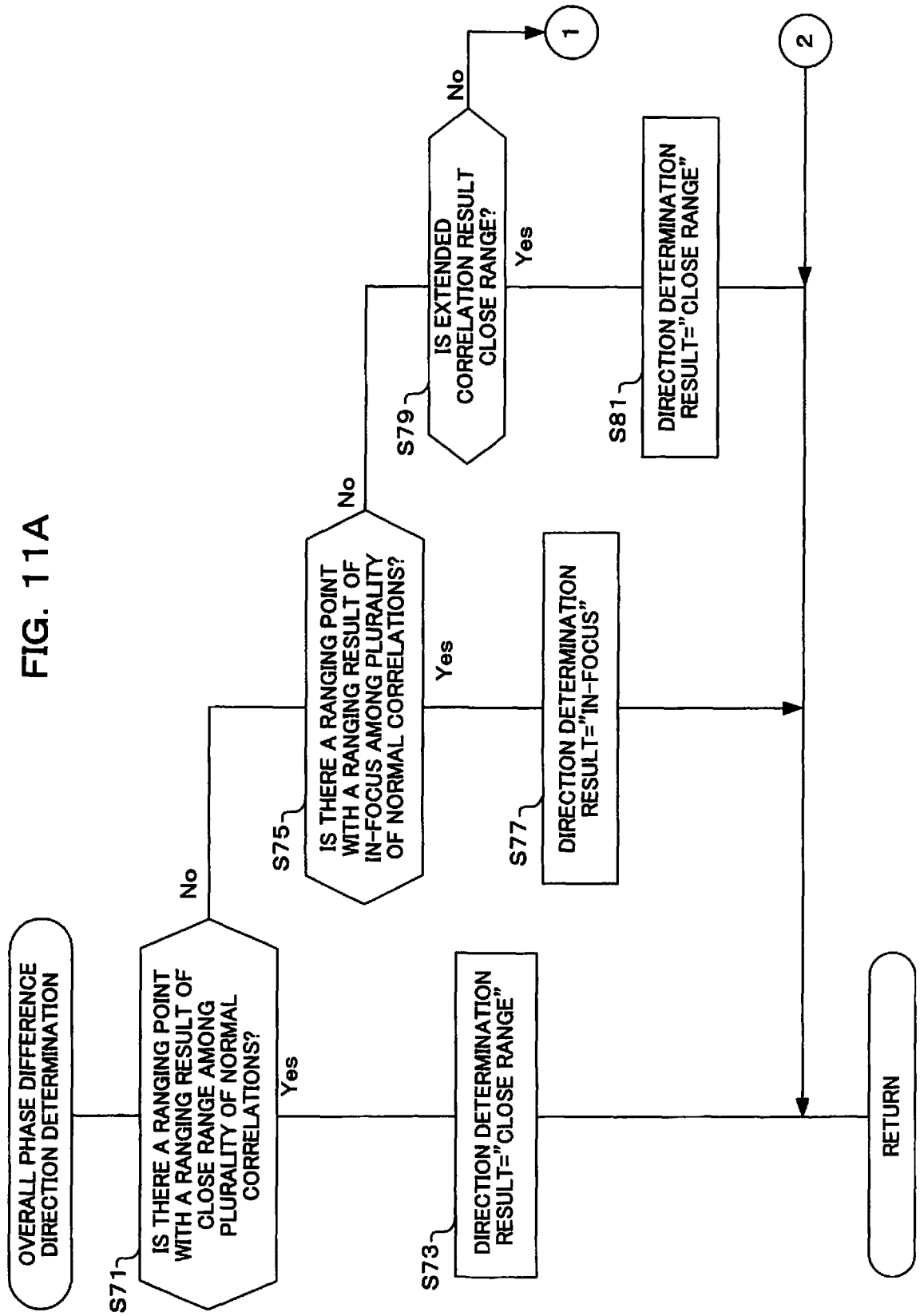
Figure 17:
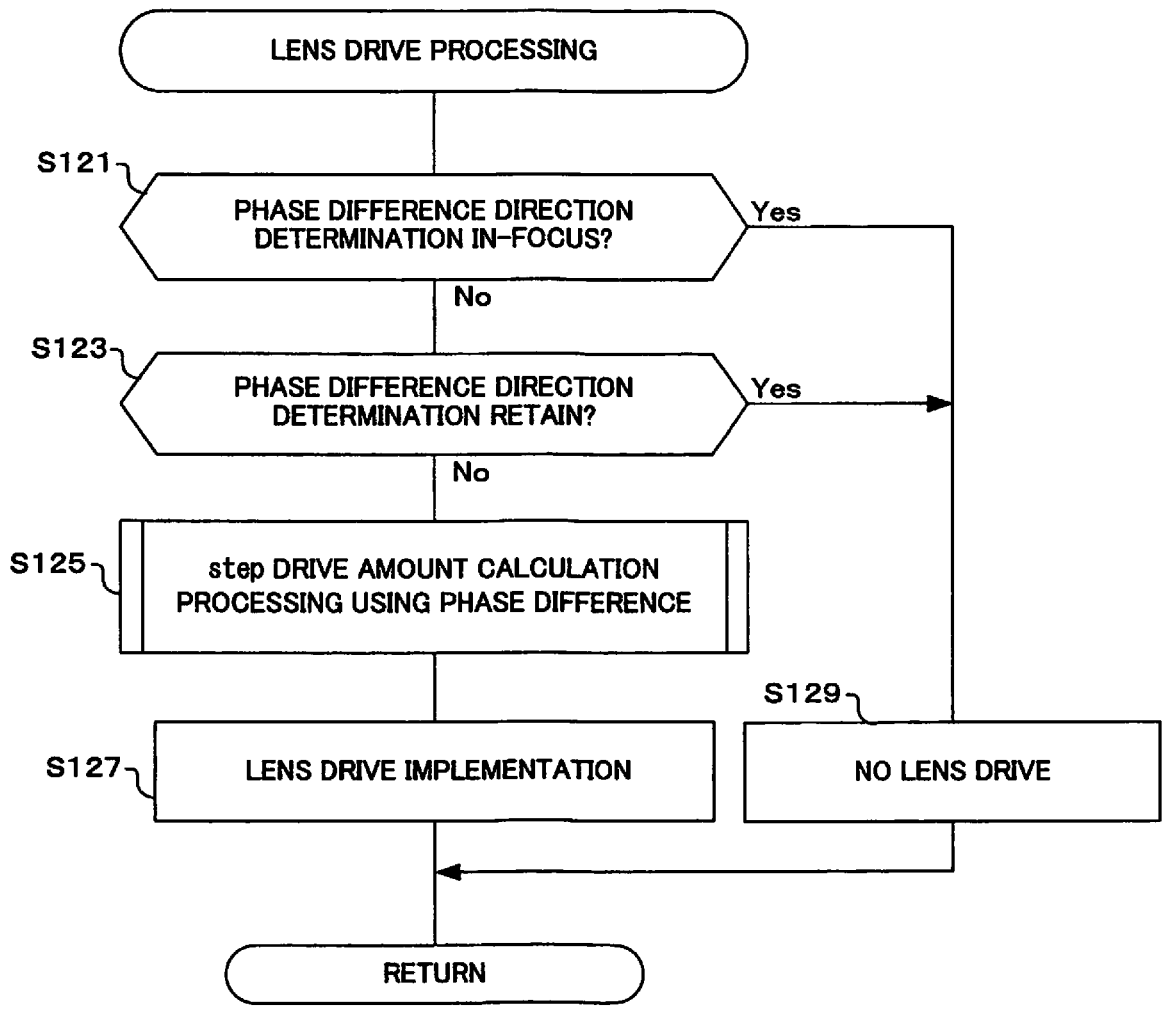
FIG. 17 is a flowchart showing operation of lens drive processing, in the camera of one embodiment of the present invention.

The above described controller (control section) performs focus adjustment when focus has been detected in at least one individual area, without close-range side being indicated with all of the plurality of first focus directions (refer, for example, to S75 and S77 in FIG. 11A, and S121 and S129 in FIG. 17). The controller (control section) determines a focus direction in which to perform focus adjustment based on a second focus direction if all of the first focus directions indicate that ranging is not possible (for example, A4 and A6 in FIG. 10, and S87 and S89 in FIG. 11B).

The above described controller (control section) determines focus direction in which to perform focus adjustment based on a third focus direction, when all of the plurality of first focus directions indicate ranging not possible, and the second focus direction also indicates ranging not possible (for example, B3, B4 and B5 in FIG. 15). The controller (control section) is capable of setting a specified number of times (refer, for example, to S57 in FIG. 9). The controller (control section) sets a specified number of times based on output of an interface for operation input (refer, for example, to S57 in FIG. 9).

Figure 13:
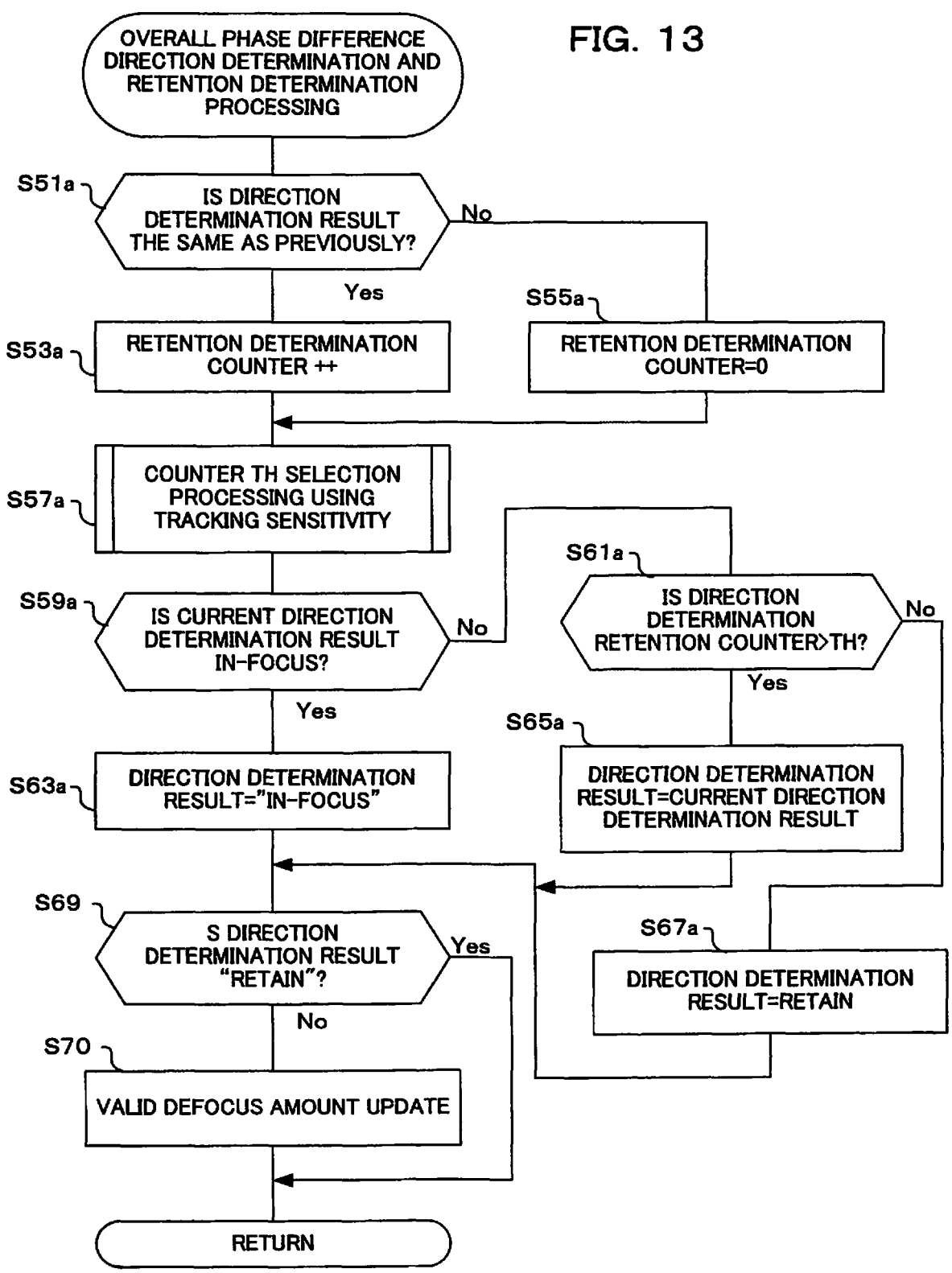
FIG. 13 is a flowchart showing operation of retention determination processing for overall phase difference direction determination processing, in the camera of one embodiment of the present invention.

The above described controller (control section) determines focus direction in which to perform focus adjustment based on a first focus direction and a second focus direction (refer, for example, FIG. 13). The controller (control section) determines direction determination results when toward the close-range side and toward the long distance side have been calculated, and the same focus direction has been calculated a given number of times (refer, for example, to S59a, S61a, and S65a in FIG. 13). The controller (control section) retains direction determination results when toward the close-range side and toward the long distance side have been calculated, and the same focus direction has not been calculated a given number of times (refer, for example, to S61a, and S67a in FIG. 13). The controller (control section) sets in-focus as direction determination result in the event that in-focus has been calculated, even if in-focus had not been calculated for a given number of times prior to that (refer, to S59a and S63a in FIG. 13).

The above described controller (control section) sets towards the close-range side as direction determination if, among a plurality of first focus directions that have been calculated by the first calculation section, there is toward the close-range side (refer, for example, to S71 and S73 in FIG. 11A). The above described controller (control section) sets in-focus as direction determination if, among a plurality of first focus directions that have been calculated by the first calculation section, there is not toward the close-range side but there is in-focus (refer, for example, to S75 and S77 in FIG. 11A). The controller (control section) makes toward the close-range side a direction determination if a first focus direction that has been calculated by the first calculation section is neither toward the close-range side or in-focus, and a second focus direction that has been calculated by the second calculation section is toward the close-range side (refer, for example, to S79 and S81 in FIG. 11A).

The AF control circuit 12 performs calculation of defocus direction and defocus amount for the photographing lens 1 (phase difference AF), based on focus detection signals output from focus detection pixels within the image sensor 7. Focus adjustment of the photographing lens 1 is performed based on the defocus direction and defocus amount that have been calculated. Also, the AF control circuit 12 performs focus adjustment of the photographing lens 1 based on a contrast value (focus evaluation value) for image signals from the image pixels within the image sensor 7 (contrast AF). Some functions of the AF control circuit 12 may also be executed by the CPU 11, and AF control may also be performed by cooperation between the CPU 11 and the AF control circuit 12.

Figure 7:
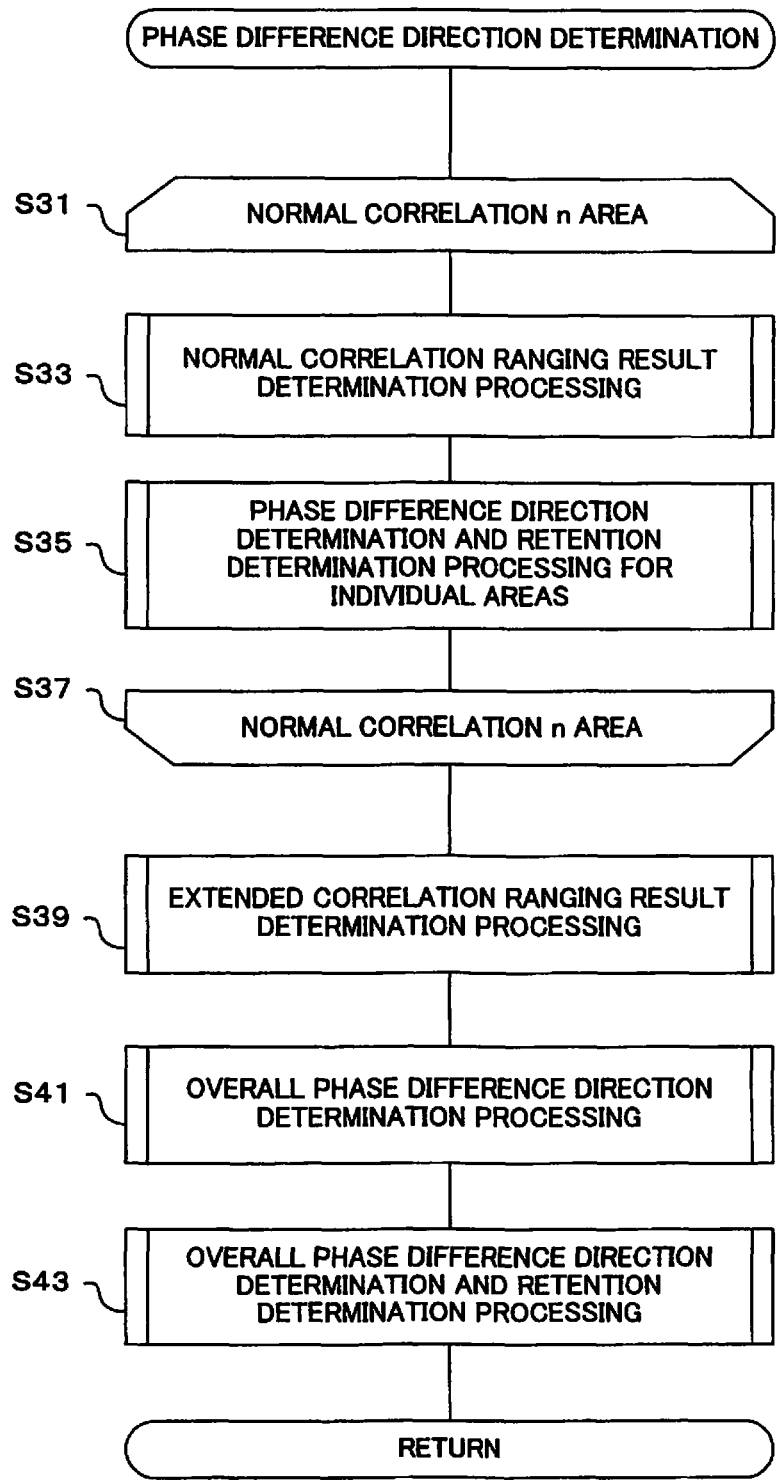
FIG. 7 is a flowchart showing operation of phase difference direction determination, in the camera of one embodiment of the present invention.

The AF control circuit 12 (or the AF control circuit 12 in cooperation with the CPU 11) functions as a first calculation section that calculates first focus direction using phase difference detection based on phase difference detection signals from the first focus detection region, within the plurality of focus detection regions (refer, for example, to the first focus detection area 31 in FIG. 2, S3 in FIG. 4, and S31-S37 in FIG. 7). The AF control circuit 12 (or the AF control circuit 12 in cooperation with the CPU 11) functions as a second calculation section that is capable of detecting a focus deviation amount that is larger than a focus deviation amount that was calculated by the first calculation section, and calculates second focus direction using phase difference detection based on phase difference detection signals from the second focus detection region, within the plurality of focus detection regions (refer, for example, to the second focus detection area 32 in FIG. 2, S3 in FIG. 4, and S39 in FIG. 7). The AF control circuit 12 (or the AF control circuit 12 in cooperation with the CPU 11) functions as a third calculation section that calculates a third focus direction that is towards being in focus, by calculating respective contrast information based on image signals of the first focus detection region and image signals of a third focus detection region that has at least part thereof shared with the second focus detection region (refer, for example, to the third focus detection area 33 in FIG. 2, and S1 in FIG. 4). It should be noted that with this embodiment, the AF control circuit 12 (and/or the CPU 11) may provide the functions of the first calculation section, second calculation section, and third calculation section, but the functions of at least one of the first, second, and third calculation sections may also be provided by one of either the AF control circuit 12 and the CPU 11, and another processor.

Figure 9:
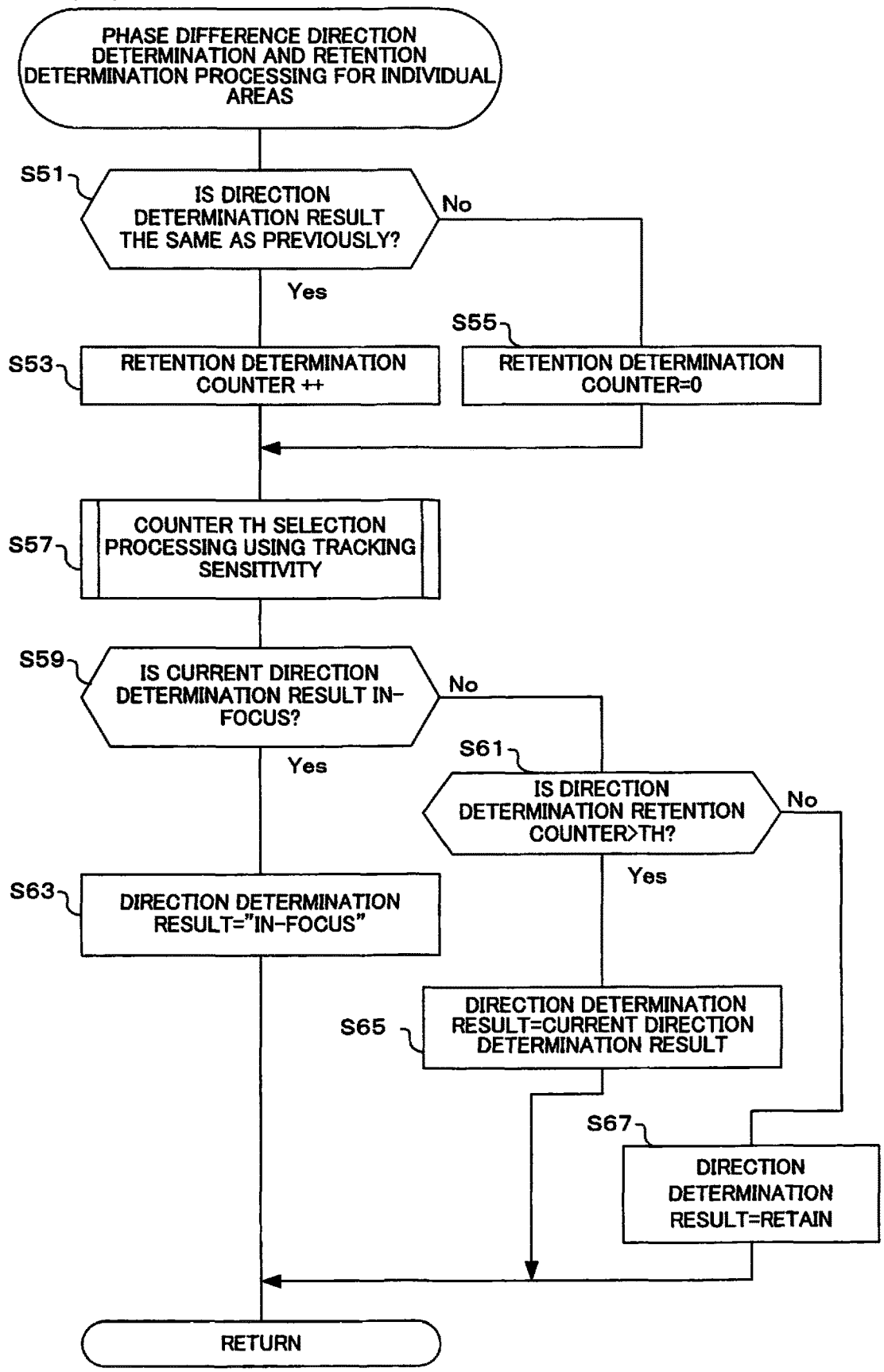
FIG. 9 is a flowchart showing operation of retention determination processing of phase difference direction determination of separate areas, in the camera of one embodiment of the present invention.

The above described first calculation section respectively detects focus direction for each of a plurality of individual areas within the first focus detection region, and if first focus directions that have been respectively calculated in time series for each of the plurality of individual areas continue to be the same for a specified number of times, determines that the first focus direction is the same direction, while if the first focus direction is not continuously the same for a specified number of times determines that ranging is not possible (refer, for example, to S61 and S65 in FIG. 9). The above described second calculation section determines focus direction of the second focus detection region (refer, for example, to S39 in FIG. 7).

The above described first calculation section calculates first focus direction by phase difference detection, using a phase difference detection signal from a first focus detection region constituted by phase difference detection pixels (refer, for example, to the first focus detection area 31 in FIG. 2, S3 in FIG. 4, and S31-S37 in FIG. 7). The above described second calculation section calculates second focus direction by phase difference detection, using a phase difference detection signal from a region that includes the phase difference detection pixels of the first focus detection region, and that is wider than the first focus detection region (refer, for example, to the second focus detection area 32 in FIG. 2, S3 in FIG. 4, and S39 in FIG. 7).

The first calculation section and second calculation section described above are capable of calculating toward the close-range side, in-focus, and toward the long distance side, as first and second focus directions (refer to FIG. 8, for example). The first focus detection region has a plurality of individual regions, and the first calculation section described above is capable of calculating first focus direction for each of the plurality of individual regions (refer to S31-S37 in FIG. 7).

The AE control circuit 13 calculates subject brightness based on a photoelectric conversion signal from the image sensor 7, and calculates exposure control values such as aperture value, shutter speed value and ISO sensitivity to give appropriate exposure, based on this subject brightness. Also, control of the aperture 3, shutter speed 5, and electronic shutter speed and ISO sensitivity etc. of the image sensor 7, may also be performed based on exposure control values that have been calculated. Some functions of the AE control circuit 13 may also be executed by the CPU 11, and AE control may also be performed by cooperation between the CPU 11 and the AE control circuit 13.

The image processing circuit 14 generates image data from a signal that has been read out from the image sensor 7, and applies various image processing such as exposure correction and noise processing, WB gain correction, edge enhancement, false color correction etc. to this image data that has been generated. Further, the image processing circuit 14 also performs processing (development processing) to convert image data that has been subjected to the above described image processing to a stored data format etc.

The facial recognition circuit 15 determines whether or not a face of a person is contained within the subject, based on image data from the image sensor 7. If the result of this determination is that a face is contained, the facial recognition circuit 15 obtains size and position etc. of the face. In a case where movie shooting mode has been set, the movie storage circuit 16 converts image data that has been processed by the image processing circuit 14 to a movie file for movie storage, and stores this movie file that has been converted in storage media 21.

The storage media 21 is an electrically rewritable non-volatile memory, and can be loaded into the body of the camera 100, like as a memory card. It should be noted that the storage media 21 may also be storage medium that is fixed to the body of the camera 100, such as a hard disk. Movie files 21a can be stored in the storage media 21. It should be noted that besides movie files 21a, image files for still pictures can also be stored in the storage media 21

Flash ROM 22 is an electrically rewritable non-volatile memory. Program code 22a and control parameters 22b are stored in the flash ROM 22. The CPU 11 performs overall control of the camera 100 in accordance with program code 22a. The control parameters 22b various adjustment values etc. for controlling the camera 100.

Display elements 24 are a liquid crystal display and organic EL etc., and are arranged on the rear surface of the camera 100 and within an electronic viewfinder. Live view display and playback display of image data that has been stored in the storage media 21, or menu screens etc., are displayed on the display elements 21. A display element drive circuit 23 causes display of images on a display element 24 based on signals from the system controller 10. A touch panel 25 detects touch operations on a display element 24, in the event that a display element 21 is arranged on the exterior of the camera 100. A touch panel drive circuit 26 detects touch operations, and outputs detection results to the system controller 10.

The camera operation switch 27 is an interface for inputting user operations to the camera 100. The camera operation switch 27 has various operation members, such as a power switch, release button, mode setting dial etc. A counter threshold value TH for direction determination retention can be set manually by operating the camera operation switch 27. The camera operation switch 27 functions as an interface for operation input (operation input section).

An SDRAM (Synchronous Dynamic Random Access Memory) 28 is a memory for temporary storage of image data (also including data resulting from having subjected a focus detection signal to AD conversion). There is a work area 28a for temporary storage of image data for processing, in the CPU 11 and each circuit within the system controller 10.

Next, the focus detection areas of this embodiment will be described using FIG. 2. As was described previously, with this embodiment three types of focus detection areas are provided. FIG. 2 shows an image plane of the image sensor 7, with a first focus detection area 31, second focus detection area 32, and third focus detection area 33 being provided within the image range (photographing screen) 7a.

The first focus detection area 31 is made up of nine focus detection areas in the example shown in FIG. 2. However, the number of areas of the first focus detection area 31 may be only one, and may be a plurality of areas other that nine. The first focus detection area 31 is an area for normal correlation calculation processing, and the AF control circuit 12 calculates defocus amount (including defocus direction) of the photographing lens 1 for each area. Specifically, for every area that belongs to this first focus detection area 31, the AF control circuit 12 calculates defocus amount (including defocus direction) of the photographing lens 1 using phase difference AF, based on a focus detection signal. By calculating defocus amount (including defocus direction) for each area, it is possible to perform more pin point AF control.

The second focus detection area 32 is set to a wider range than the range of the individual areas of the first focus detection area 31. With the example shown in FIG. 2, the second focus detection area 32 is only a single area. Specifically, a region corresponding to or including three areas that are adjacent within the first focus detection area 31 is made a single area. However, the number of areas of the second focus detection area 32 may also be two or more. Specifically, the AF control circuit 12 calculates defocus amount (including defocus direction) of the photographing lens 1 using phase difference AF, based on focus detection signals for the entire range of the second focus detection area 32.

The second focus detection area 32 is an area for extended correlation calculation processing, and a range in which detection of phase difference is possible is wider compared to the first focus detection area 31. This means that compared to phase difference information from the first focus detection area 31, it is possible to detect large focus deviation amount. In other words, it is possible to calculate defocus amount (including defocus direction) even if a subject image formed by the photographing lens is quite out of focus. Therefore, phase difference detection using extended correlation relating to the second focus detection area 32 enables detection of phase difference amount (defocus amount) for a wider range in both close range end and infinity end than phase difference information obtained from the first focus detection area 31. However, detection precision of extended correlation has a characteristic that is lower that detection precision of normal correlation. One example of a structure that can calculate defocus amount even when quite out of focus is disclosed in Japanese patent laid-open No. 2016-9067, and so detailed description will be omitted. Methods etc. that extend phase difference calculation for correlation calculation by changing pixel range (number) of a correlation window for correlation calculation are known.

The third focus detection area 33 is a detection area for contrast AF, and is set in a range that includes the first focus detection area 31. The AF control circuit 12 detects contrast value (focus evaluation value) based on image signals within this third focus detection area 33. The AF control circuit 12 and/or the CPU 11 then move the focus lens by means of the focusing mechanism 2 to a position where the contrast value becomes a peak. The AF control circuit 12 and/or the CPU 11 can determine whether a direction in which the photographing lens 1 will achieve focus is toward the close range end or the infinity end, from change in movement direction and contrast value at the time the photographing lens has been moved.

Next, movie AF of this embodiment will be described using FIG. 3. Movie AF is processing to continuously perform focus adjustment so as to focus on a subject at the time of movie shooting. It should be noted that it is also possible to perform image display with high focus tracking at the time of live view display, if movie AF is executed.

Figure 3:
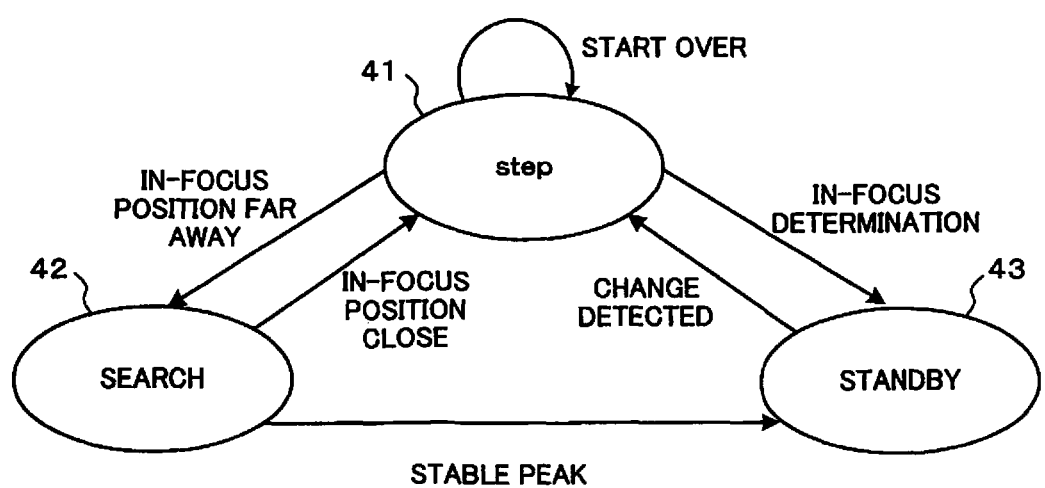
FIG. 3 is a state transition diagram of control phases at the time of movie AF, with the camera of one embodiment of the present invention.

As shown in FIG. 3, with movie AF of this embodiment, processing state transitions between three control phases, which are a step phase 41, a search phase 42, and a standby phase 43. In the step phase 41, the focus lens is driven to an in-focus position using a combination of relative drive of the focus lens by minuscule amounts in either a close range direction or an infinity direction (first direction), and relative drive of the focus lens by minuscule amounts in a direction that is opposite to the first direction (second direction). Relative drive of the focus lens by minuscule amounts in a given direction in this manner is called step drive. Details of the step phase will be described later (refer to FIG. 4). In the search phase 42, ranging is performed while continuously driving the focus lens in either the close range direction or the infinity direction, and the focus lens is driven to the in-focus position. In the standby phase 43 there is a standby state where the focus lens is not driven and only ranging is repeatedly performed.

In the step phase 41, when it has been determined that the position of the focus lens is far from in-focus position the control phase transitions to the search phase 42. As a result of the transition to the search phase 42, the focus lens is rapidly moved to the vicinity of an in-focus position. On the other hand, when it has been determined in the step phase 41 that the lens position is at an in-focus position (in-focus determination), the control phase transitions to the standby phase 43, and lens drive is stopped. Also, when it is been determined in the step phase 41 that an end position within the movement range of the focus lens has been reached, the control phase transitions to the standby phase 43, and lens drive is stopped.

When it has been determined in the search phase 42 that the lens position is in the vicinity of an in-focus position (close to in-focus position), the control phase transitions to the step phase 41. After this, the focus lens is moved to the in-focus position by step drive. On the other hand, when it has been determined in the search phase 42 that the lens position is in a steady state (steady contrast peak) at the in-focus position, the control phase transitions to the standby phase 43 and lens drive is stopped.

In the standby phase 43, when there has been detection of movement of the camera 100 (change in attitude), or there has been change in contrast of an image that has been acquired, change in face recognition information etc., namely when change in condition of the camera 100 or subject has been detected (change detection), the control phase transitions to the step phase 41. At this time, step drive is commenced so as to put the focus lens in a focused state.

Next, operation of the step phase 41 will be described using the flowchart shown in FIG. 4. Processing related to this flowchart shown in FIG. 4 (this also includes FIG. 5, FIG. 7, FIG. 9, FIG. 11A, FIG. 11B, FIG. 13, FIG. 16 and FIG. 17) is implemented by the CPU 11 controlling each circuit etc. within the camera 100 based on program code 22a.

If the flow for step phase processing shown in FIG. 4 is commenced, first, contrast AF computational processing is performed (S1). In this step, drive direction of the photographing lens 1 is determined using contrast AF. Specifically, the AF control circuit 12 calculates contrast value (focus evaluation value) using signals from the image pixels of the image sensor 7. When the photographing lens 1 has moved in one direction, the AF control circuit 12 determines whether contrast value has increased or decreased. The AF control circuit 12 obtains lens drive direction to increase contrast value based on the result of this determination.

If contrast AF computational processing has been performed, next, phase difference computational processing is performed (S3). In this step, the AF control circuit 12 calculates phase difference information (defocus amount and defocus direction) by phase difference AF using signals from focus detection pixels of the image sensor 7, and based on this information obtains whether direction in which a subject will become in focus is close range, infinity, indeterminate, retain, or in-focus. It should be noted that direction in which a subject will become in focus is close range (close range end, toward the close-range side) or infinity (infinity end, toward the long distance side), but a state where direction cannot be detected is made "indeterminate", a state where detection is in progress is made "retain", and a state where the subject is in focus and the above described direction does not exists is made "focus", and these states are also included in the description of "direction". Also, a direction in which a subject will become in focus is obtained, and a result that has been determined is called direction determination result. Detailed operation of this phase difference computational processing will be described later using FIG. 5.

If phase difference computational processing has been performed, next, hybrid direction determination is performed (S5). In this step, overall direction determination is performed using a direction determination result from contrast AF that was performed in step S1, and a direction determination from phase difference information that was obtained in step S3. Specifically, in the step phase 41, at the time of determination of movement direction of the focus lens, determination is performed comprehensively using a direction determination result from contrast AF and a direction determination result from phase difference information. Detailed operation of the hybrid direction determination will be described later using FIG. 14.

If hybrid direction determination has been performed, next, in-focus determination is performed (S7). In this step, determination as to whether or not a subject is in-focus is performed using either of in-focus determination using contrast AF and in-focus determination using phase difference AF, and if the subject is determined to be in-focus there is a transition to the standby phase 43 in the next frame, while if it is not determined that the subject is in-focus the step phase 41 continues (refer to FIG. 3). Detailed operation of this in-focus determination will be described later using FIG. 16.

Once the in-focus determination has been performed, lens drive processing is next performed (S9). In this step, lens drive processing is performed in accordance with a result of phase difference computational processing in step S3, and a result of hybrid direction determination in step S5. Detailed operation of this lens drive processing will be described later using FIG. 17 and FIG. 18.

Once the lens drive processing has been performed, search transition determination processing is next performed (S11). In this step it is determined whether, in the next frame, there will be transition to the search phase 42 or the step phase 41 will continue (refer to FIG. 3). Once the search transition determination processing has been performed, the originating main flow is returned to. If the step phase 41 continues in the next frame, processing from step S1 is performed.

In this way, in the flow for the step phase processing, when the step phase 41 is being performed at the time of movie AF (refer to FIG. 3), determination of drive direction is performed using ranging results from contrast AF and phase difference AF. Since determination is performed comprehensively using both contrast AF and phase difference AF, it is possible to reliably perform focus control even if a subject is in various states.

Figure 5:
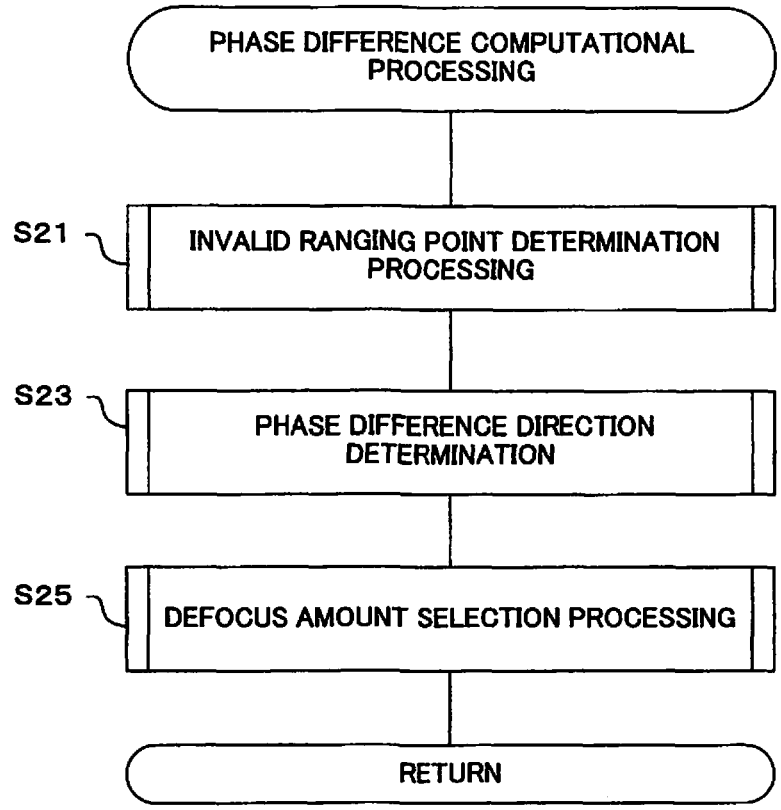
FIG. 5 is a flowchart showing operation of phase difference computational processing, in the camera of one embodiment of the present invention.

Next, operation of the phase difference computational processing in step S3 will be described using the flowchart shown in FIG. 5. If the flow for phase difference computational processing is commenced, first, determination processing as to whether or not there is are invalid ranging points is performed (S21). In this step, ranging data that has low reliability is set to invalid in the second focus detection area 32, for each area within the first focus detection area 31. Determination of reliability may utilize a known method when performing phase difference AF. Focus detection areas that have been determined as invalid are removed at the time of phase difference direction determination that is performed in the next step S23.

If invalid ranging point determination processing has been performed, next, phase difference direction determination is performed (S23). In this step, direction determination using phase difference AF is performed using normal correlation results based on signals from the first focus detection area 31, and extended correlation results based on signals from the second focus detection area 32. As was described previously, there are 5 types of direction determination results, namely "close range", "infinity", in-focus", "indeterminate" and "retain". Detailed operation of this phase difference direction determination processing will be described later using FIG. 7.

Next, defocus amount selection processing is performed (S25). Defocus amount is selected based on overall phase difference AF, using defocus amount for normal correlation that was calculated for each area within the first focus detection area 31. This defocus amount selection processing will be described later using FIG. 14. Once defocus amount selection processing has been completed, the originating flow is returned to.

This way, in the flow for phase difference computational processing, direction in which to drive the focus lens is determined based on phase difference ranging results (refer to S23), and further, defocus amount for final step drive is selected from among a plurality of defocus amounts that have been calculated in a plurality of focus detection areas (S25). In the step phase 41 for movie AF, the focus lens is driven using step drive, and drive direction at this time is determined.

Next, the phase difference direction determination processing of step S23 (refer to FIG. 5) will be described. This phase difference direction determination determines five types, namely close range, infinity, in-focus, indeterminate, or retain, in accordance with ranging results. Also, when performing phase difference direction determination, direction determination is performed based on ranging results for a plurality of normal correlations, and extended correlations.

Figure 6:
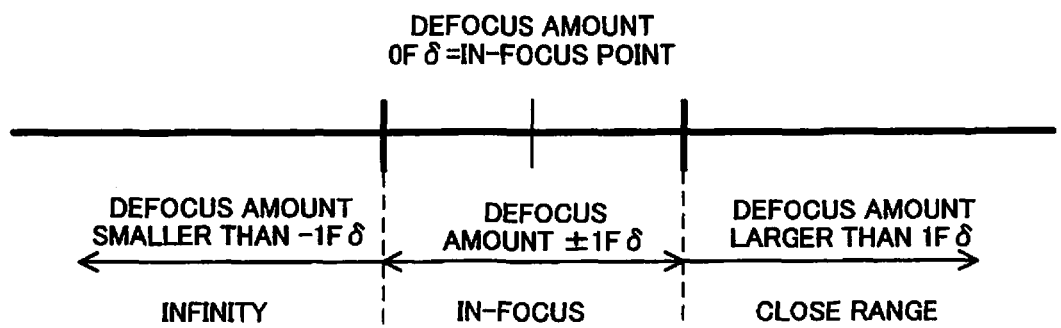
FIG. 6 is a drawing showing determination of infinity, in focus, and close range based on defocus amount, in the camera of one embodiment of the present invention.

First, determination of infinity, in focus, and close range, that are performed based on defocus amount for phase difference AF, will be described using FIG. 6. In the case where defocus amount that has been calculated using phase difference AF is "0Fδ", it is determined to be at a focus point. Here, F is aperture value, and δ is a numerical value determined by pixel pitch of the image sensor 7. In any event, since there is multiplication by "0", 0Fδ becomes 0. If defocus amount is in a range of ±1Fδ, with focus point (0Fδ) as a center, "in focus" is determined. Then, if defocus amount is smaller than −1Fδ "infinity" is determined, while if defocus amount is larger than +1Fδ "close range" is determined.

Next, operation of the phase difference direction determination (processing) in step S23 will be described using the flowchart shown in FIG. 7. If the flow for phase difference direction determination processing is commenced, then processing using normal correlation is performed for each area (also called "individual areas") of the first focus detection area 31, in steps S31 to S37. First, an area n in which normal correlation is performed is set (S31). With the example shown in FIG. 2, inside the first focus detection area 31 is divided into nine areas. In this case, position n of each area is made 1 to 9, and area position is sequentially changed each time the processing of steps S31 to S37 is completed.

Once area position in which normal correlation will be performed has been set, next, determination processing for ranging results using normal correlation calculation is performed (S33). In this step, defocus amount is calculated using phase difference AF for each individual area that has been set within the first focus detection area 31, and direction determination is performed for each individual area in accordance with this computation result. As shown in FIG. 8, a result of this direction determination is one of the four determinations such as "indeterminate, "in-focus", "close range", or "infinity". Indeterminate is set in a case where ranging using phase difference AF is not possible, and defocus amount cannot be calculated. In a case where the determination is not "indeterminate", determination is one of "in-focus", "close range", or "infinity", as was described using FIG. 6, in accordance with whether defocus amount was within or outside ±1Fδ.

Next, phase difference direction determination and retention determination processing individual areas is performed (S35). In this step, when direction determination result in step S33 for individual areas within the first focus detection area 31 is the same as direction determination results that have been calculated based on focus detection signals of a single frame that has been read out from the image sensor 7 previously, a counter value of a retention determination counter, which will be described later, is updated to count up, while if the direction determination result is different to the previous time this counter is set to 0. Then, if a counter value of this counter exceeds a threshold value TH, the direction determination result for this time is updated as a direction determination result for that area (ranging point). With unstable conditions, such as when a subject is moving, or with a subject with for which phase difference detection is difficult (for example, a periodicity-containing subject etc.) there is a possibility of ranging result of individual areas that have been finely divided being erroneous, resulting in instability. Therefore, if it is not a case where direction determination results are stable, focus adjustment based on incorrect ranging results is prevented by making the direction determination "retain". Detailed operation of this phase difference direction determination and retention determination processing for individual areas will be described later using FIG. 9.

If the phase difference direction determination and retention determination processing for individual areas has been performed, it is determined whether processing has been completed for all areas in which normal correlation calculation processing is performed, and if processing has not been completed the processing of steps S33 and S35 is executed for the next area (S37).

Once the processing of steps S33 and S35 has been performed for all areas within the first focus detection area 31, next, determination processing for ranging results using extended correlation is performed (S39). In this step, extended correlation calculation processing is performed, and determination is performed based on those ranging results Specifically, the AF control circuit 12 performs correlation calculation using signals from focus detection pixels within the second focus detection area 32 (refer to FIG. 2), and defocus amount is calculated. This defocus amount that has been calculated is compared with the threshold value (±1Fδ) that was shown in FIG. 6, and which of infinity, in focus, and close range is determined, similarly to step S33. Also, in a case where ranging is not possible, indeterminate is determined (refer to FIG. 8). Also, similar processing to that of step S35 may also be applied to results of extended correlation ranging result determination processing of step S39.

If determination for ranging results using extended correlation has been performed, next, overall phase difference direction determination processing is performed (S41). In this step, direction determination is performed based on phase difference AF overall, using ranging result determination processing using normal correlation calculation and phase difference direction determination and retention determination processing for individual ranging areas, that were performed in steps S33 and S35, and results of ranging result determination processing using extended correlation calculation that was performed in step S39. Specifically, it is determined whether direction in which a subject will become in focus (direction determination result) is "close range", "in-focus", "infinity", "indeterminate" or "retain (normal correlation calculation only)", by using results of normal correlation calculation and extended correlation calculation. In this step, comprehensive judgment is performed regarding direction that will make a subject in focus, based on phase difference AF overall (including results of both normal correlation calculation and extended correlation calculation), using these determination results, and a direction determination result for phase difference AF overall is obtained. Detailed operation of this overall phase difference direction determination processing will be described later using FIG. 10 to FIG. 11B.

If overall phase difference direction detection processing has been performed, next, retention determination processing for overall phase difference direction determination is performed (S43). With movie AF, it is conceivable that if there is frequent change in drive direction of the focus lens an image will become visually unappealing, and reliability of direction determination results, in a state where direction determination results are changing often, will be low. Therefore, in this step final direction determination (refer to FIG. 13) is made "retain" until overall phase difference direction determination result is stable. Detailed operation of this retention determination for overall phase difference direction determination will be described later using FIG. 12 and FIG. 13. If retention determination processing for overall phase difference direction determination has been performed, the originating flow is returned to.

In this way, in the flow for phase difference direction determination (refer to FIG. 7), normal correlation calculation, and phase difference direction determination and retention determination processing are performed for each individual area within the first focus detection area 31 (S33, S35), extended correlation calculation is performed for the second focus detection area 32 (S39), and ranging results using phase difference AF are obtained for both a narrow phase difference detection range and a wide phase difference detection range. Direction determination (overall phase difference direction determination) is then performed using these ranging results (S41, S43). This means that it is possible to reliably determine movement direction of the focus lens even if there is a small subject with a mix of near and far objects, or subject is in a quite out of focus state.

Next, the retention determination processing for phase difference direction determination for individual areas in step S35 will be described using the flowchart shown in FIG. 9. As was described previously, this flow is sequentially executed for each individual area within the first focus detection area 31 (refer to FIG. 2).

If the flow shown in FIG. 9 is commenced, first, it is determined whether or not a direction determination result (for an individual area) is the same as the previous time (S51). If signals for one frame are read out from the image sensor 7, the AF control circuit 12 executes the processing shown in FIG. 4, and a direction determination result is obtained in step S33 at that time. Specifically, in step S33 one of either "in-focus", "close range", "infinity", or "indeterminate" is output as a ranging result (direction determination result) for each individual area within the first focus detection area 31 (refer to FIG. 8). In this step it is determined whether or not a determination result (direction determination result) for the previous time is the same as the determination result (direction determination result) this time. Assuming that, for example, for individual area 1, normal correlation calculation is performed in individual area 1 within the previous frame, and normal correlation calculation is performed in individual area 1 within the current frame. In this case, in step S51 determination is regarding whether or not determination result (direction determination result) is the same the previous time and currently.

If the result of determination in step S51 is that the direction determination result is the same as previously, 1 is added to a retention determination counter (S53). On the other hand if the direction determination result is not the same as previously, the retention determination counter is set to 0 (S55). The retention determination counter may be a counter that is constituted by hardware within the system controller 10, and may be a software counter in a program for execution by the CPU 11.

If a value for the retention determination counter has been set in steps S53 or S55, next, selection of a counter threshold value TH is performed by setting tracking sensitivity (S57). As was described previously, in a state where respective direction determination results are not stable, reliability of direction determination results is low. Therefore, a direction determination result is adopted in a case where direction determination results are the same continuously to a certain extent. In this step a counter threshold value TH for determining the extent of this continuity is selected. This threshold value TH may be set manually by the user using the camera operation switch 27 etc., may be set automatically in a conditions where as shooting mode etc. is set, and may be set by automatically determining subject conditions. In a case where the user manually sets tracking sensitivity, for example, threshold value TH=0 may be with a sensitive setting, threshold value TH=4 may be with a standard setting, and threshold value TH=6 may be with a low sensitivity setting.

Once the counter threshold value TH been selected, next, it is determined whether or not a result of the current direction determination is in focus (S59). Here, it is determined whether or not the direction determination result based on normal correlation and ranging result determination processing in step S33 is "in focus". If the result of this determination is that the current direction determination result is in focus, it is determined that direction determination result="in focus" (S63).

On the other hand, if the result of determination in step S59 is that the current direction determination result is not in focus, next, it is determined whether or not the direction determination retention counter (retention determination counter for direction determination) is larger than the threshold value TH (S61). In steps S51 to S55 count operation of the retention determination counter is performed based on the previous and current direction determination results, and in step S57 selection of a counter threshold value TH is performed. In this step, it is determined whether or not the count value of the direction determination retention determination counter is larger than the counter threshold value TH.

If the result of determination in step S61 is that the count value of the retention determination counter for direction determination is larger than the count threshold value TH, direction determination result=current direction determination result is set (S65). In this step, since the direction determination result has been the same continuously for a specified number of times, it is determined that reliability of the current direction determination result is high, and the current direction determination result (either of "close range", "infinity", or "indeterminate") is determined as the direction determination result for an individual area.

On the other hand, if the result of determination in step S61 is that the count value of the retention determination counter for direction determination is not larger than the counter threshold value TH, direction determination result=retain is set (S67). In this step, since the direction determination result is not stable it is determined that reliability of the current direction determination result is low, a direction determination result for the individual area cannot be determined, and the direction determination result is made retain.

If a direction determination result has been decided for each individual area in steps S63, S65 and S67, the retention determination processing phase difference direction determination for individual areas shown in FIG. 9 is terminated, and the originating flow is returned to.

in this way, in the phase difference direction determination and retention determination processing for individual areas, even if either of "close range", "infinity", in-focus", or "indeterminate" has been determined (refer to S33), if a determination result is not the same for a specified number of times, a direction determination result is made retain (refer to S61, S65 and S67). However, in a case where "in focus" has been determined, a direction determination result of "in-focus" is determined even if a determination result does not continue for a specified number of times (refer to S59 and S63). Also, the specified number of times for determining a number of times that the determination result continues can be appropriately set (refer to S57).

Next, the overall phase difference direction determination processing of step S41 (refer to FIG. 7) will be described using the table shown in FIG. 10, and the flowcharts shown in FIG. 11A and FIG. 11B. This overall phase difference direction determination processing is performing determination of phase difference direction overall, using results of normal correlation calculation processing and results of extended correlation calculation processing.

The table shown in FIG. 10 shows overall phase difference direction determination result (refer to the rightmost column in FIG. 10) for direction determination results (specifically, either of "close range", "in-focus", "infinity", "indeterminate" and "retain") using normal correlation calculation (refer to FIG. 9), and for direction determination results (specifically, either of "towards close up", "in focus", "towards infinity", or "indeterminate") using extended correlation calculation (S39). In columns corresponding to normal correlation calculation (direction determination results) in FIG. 10, the symbol "○" means a case where there is an area of the relevant ranging result (direction determination result), "x" means that there is not an area of the relevant ranging result (direction determination result), and "–" means not relevant, namely, that it doesn't matter whether there is or is not a ranging result (direction determination result). Specifically, areas that are subjects for normal correlation calculation are in the first focus detection area 31, and within this area a plurality of individual areas are contained (with the example shown in FIG. 2, nine individual areas). "○" includes a case where there is a single relevant ranging result (direction determination result) within a plurality of individual areas.

As will be understood from the table of FIG. 10, if a result of normal correlation calculation is that a direction determination result of a single individual area has been determined to be "close range" the overall phase difference direction determination result becomes "close range" (refer to line A1). Generally, a subject that is more to the close range end will often be the main subject. As requirements for focus precision become stricter with the advancement in high image quality, larger lens maximum opening diameter, and increase in size of image sensors, more accurate focus on a close in subject is required. Also, if there is not a single individual area for which a direction determination result is that close range has been determined, if there is even a single individual area in which in-focus has been determined then the overall phase difference direction determination result becomes "in-focus" (refer to line A2). If there is no subject at the near side, and there is an individual area in which in-focus has been determined, this takes precedence. In this case there is a possibility of detecting the existence of a subject that is more to the close range end than an in-focus position from extended correlation calculation, but since extended correlation calculation has worse ranging precision than normal correlation calculation, extended correlation calculation results are disregarded.

Also, in the event that there is not even a single individual area in which a direction determination result is that close range or in-focus has been determined, and there is even a single individual area in which the direction determination result is that infinity has been determined, a direction determination result for extended correlation calculation is taken into consideration. Specifically, if a direction determination result using extended correlation calculation is close range, the overall phase difference direction determination result is made "close range" (refer to line A3), while if a direction determination result using extended correlation calculation is other than close up the overall phase difference direction determination result is made "infinity" (refer to line A4).

Also, in the event that there is not even a single individual area in which a direction determination result of close range, in-focus or infinity has been determined, and there is even a single individual area in which indeterminate has been determined, a direction determination result for extended correlation calculation is taken into consideration. Specifically, if a direction determination result using extended correlation calculation is close range, the overall phase difference direction determination result is made "close range" (refer to line A5), while if a direction determination result using extended correlation calculation is other than close range the overall phase difference direction determination result is made "indeterminate" (refer to line A6).

Also, in the event that there is not even a single individual area in which a direction determination result of close range, in-focus, infinity or indeterminate has been determined, and there is even a single individual area in which retain has been determined, a direction determination result for extended correlation calculation is taken into consideration. Specifically, if a direction determination result using extended correlation calculation is close range, the overall phase difference direction determination result is made "close range" (refer to line A7), while if a direction determination result using extended correlation calculation is other than close range the overall phase difference direction determination result is made "retain" (refer to line A8).

The flowcharts shown in FIG. 11A and FIG. 11B are routines for implementing the relationships shown in the table of FIG. 10. If the flow for overall phase difference direction determination processing is commenced, first, it is determined whether or not there a ranging result (direction determination result) that is a close range ranging point within a plurality of normal correlations (S71). Here, as was described on line A1 in FIG. 10, it is determined whether or not there is even a single individual area, among a plurality of individual areas of the first focus detection area 31, where ranging result (direction determination result) has become close range. If the result of this determination is Yes, (overall phase difference) direction determination result="close range" is set (S73).

If the result of determination in step S71 is No, it is next determined whether or not there is a ranging point with a ranging result (direction determination result) of in focus among a plurality of normal correlations (S75). Here, as was described on line A2 in FIG. 10, it is determined whether or not there is even a single individual area, among a plurality of individual areas of the first focus detection area 31, where ranging result (direction determination result) has become in-focus. If the result of this determination is Yes, (overall phase difference) direction determination result="in-focus" is set (S77).

If the result of determination in step S75 is No, it is next determined whether or not a result for extended correlation (direction determination result) is close range (S79). Here, as was described on line A3, line A5 and line A7 in FIG. 10, if there is not even a single individual area, among the plurality of individual areas of the first focus detection area 31, for which a ranging result (direction determination result) has become close range and in-focus, it is determined whether or not a result for extended correlation (direction determination result) is close range. If the result of this determination is Yes, (overall phase difference) direction determination result="close range" is set (S81).

If the result of determination in step S79 is No, it is next determined whether or not there is a ranging point with a ranging result (direction determination result) of infinity among a plurality of normal correlations (S83). Here, as was described on line A4 in FIG. 10, it is determined whether or not there is not even a single individual area, among the plurality of individual areas of the first focus detection area 31, for which a ranging result (direction determination result) has become close range and in-focus, but there is at least one individual area in which (direction determination result) has become infinity. In this case, from the determination of step S79 the direction determination result for extended correlation is not close range. If the result of determination in step S83 is Yes, (overall phase difference) direction determination result="infinity" is set (S85).

If the result of determination in step S83 is No, it is next determined whether or not there is a ranging point (ranging area) with a ranging result (direction determination result) of indeterminate among a plurality of normal correlations (S87). As was described on line A6 in FIG. 10, it is determined whether or not there is not even a single individual area, among the plurality of individual areas of the first focus detection area 31, for which a ranging result (direction determination result) has become close range, in-focus, or infinity, but there is at least one individual area in which (direction determination result) has become indeterminate. It should be noted that with this determination in step S87, a case where a direction determination result for extended correlation becomes close range has been excluded in the determination of step S79. If the result of determination in this step S87 is Yes, (overall phase difference) direction determination result="indeterminate" is set (S89).

On the other hand, if the result of determination in step S87 is No, (overall phase difference (direction determination result)="retain" is set (S91 As was described on line A8 in FIG. 10, it is determined whether or not there is not even a single individual area, among the plurality of individual areas of the first focus detection area 31, for which a ranging result (direction determination result) has become close range, in-focus, infinity, or indeterminate, but there is at least one individual area in which (direction determination result) has become retain. It should be noted that a case where a direction determination result for extended correlation becomes close range has been excluded in the determination of step S79.

If determination of (overall phase difference) direction determination result has been performed in steps S73, S77, S81, S85, S89 and S91, the originating flow is returned to.

In this way, with the overall phase difference direction determination processing (refer to FIG. 11A and FIG. 11B), if there is close up among ranging results (direction determination results) of the plurality of normal correlations, the overall phase difference direction determination result is determined to be "close range" (refer to S71 and S73). Since precision of normal correlation is high, and the possibility of a subject more towards the close-up end being the main subject is high, the overall phase difference direction determination result is made close range. Also, if there is not close range among ranging results (direction determination results) of a plurality of normal correlations, and there is in-focus, the overall phase difference direction determination result is determined to be "in-focus" (refer to S75 and S77). Since precision of normal correlation is high, overall phase difference direction determination result is made "in-focus".

Also, with the overall phase difference direction determination processing (refer to FIG. 11A and FIG. 11B), if there is not close range or in-focus among ranging results direction determination results) for normal correlation, if a result (direction determination result) for extended correlation is close range then the overall phase difference direction determination result is determined to be "close range" (refer to S79 and S81). Precision of extended correlation is lower than that for normal correlation, but if there is a subject that is more to the close-up end there is a possibility that it will be a main subject, and so the overall phase difference direction determination result is made close range. Also, when a result (direction determination result) for a plurality of normal correlations is not close range or in-focus, and a result (direction determination result) for extended correlation is not close range, if there is infinity among the ranging results (direction determination results) of a plurality of normal correlations, the overall phase difference direction determination result is determined to be "infinity" (refer to S79, S83 and S85). Since close range is prioritized, a determination of "close range" for extended correlation is adopted over a determination of "infinity" using normal correlation for which precision is high.

In a case where there is an indeterminate ranging point (individual area) among direction determination results for a plurality of normal correlations, the overall phase difference direction determination result is set to "indeterminate" (S87, S89). Also, in a case where there is neither "infinity", "close range", "in-focus", or "indeterminate", the overall phase difference direction determination result is made "retain" (refer to S87 and S91). However, although not shown in FIG. 11A and FIG. 11B, even in the case of indeterminate and retain, as described above, in a case where a direction determination result using extended correlation is close range, the overall phase difference direction determination result is made "close range" (refer to S81, and to A5 and A7 in FIG. 10).

Next, retention determination processing for overall phase difference direction determination, of step S43 (refer to FIG. 7) will be described using the table shown in FIG. 12, and the flowchart shown in FIG. 13. As has been described above, at times of instability etc. such as when a subject is moving, the overall phase difference direction determination result will also become unstable, and if focus lens drive is performed on the basis of an erroneous overall phase difference direction determination result focus will become unstable, and an image will be visually unappealing. Retention determination processing for overall phase difference direction determination prevents this type of unstable lens drive.

FIG. 12 shows processing examples for a case of performing retention determination processing for overall phase difference direction determination, in time series. n, n+1, n+2, . . . shown in the horizontal direction represent frame numbers of images that have been acquired for phase difference detection. It should be noted that "Near" means close range and "Far" means infinity. "Near", "Far", and "in-focus" are determined for every frame during the phase difference direction determination processing of step S41. Also, with this example, a threshold value TH for the retention determination counter for direction determination (refer to S57 and S61 in FIG. 9) is "2".

In the $n^{th}$ frame, the (overall phase difference) direction determination result is different between the previous time and the current time, and so the final direction determination becomes "retain", and the retention determination counter is 0. In the $n+1^{th}$ frame, the (overall phase difference) direction determination result is the same for the previous time and the current time, and so 1 is added to the retention determination counter. It should be noted that a valid defocus amount is defocus amount at the time when (overall) phase difference direction determination result is not retain.

In the $n+2^{th}$ frame, similarly to the $n+1^{th}$ frame, (overall phase difference) direction determination result is the same for the previous time and the current time, and so 1 is added to the retention determination counter. In the $n+3^{th}$ frame the retention determination counter becomes 3, and since the threshold value TH (2) has been exceeded the (overall phase difference) direction determination result is made "Far". Also, valid defocus amount is updated. After that, the retention determination counter is exceeding the threshold value TH in the $n+4^{th}$ frame and $n+5^{th}$ frame also, and so the final (overall phase difference) direction determination result is kept at "Far", and valid defocus amount is updated.

In the $n+6^{th}$ frame, the (overall phase difference) direction determination result "Far" for the previous time and (overall phase difference) direction determination result "Near" for the current time are once again different, and so the retention determination counter is cleared to 0, and the final (overall phase difference) direction determination result is made "retain". Also, valid defocus amount maintains the same value as for the previous frame. It should be noted that if valid defocus amount is small (if in-focus position it is near) then lens drive amount based on contrast AF is made 0, while conversely if valid defocus amount is large (in-focus position is far), both stability and followability movie AF are reconciled by performing lens drive in accordance with the current defocus amount.

In the $n+7^{th}$ frame, the previous direction determination result and the current direction determination result at the same i.e. "Near", and so 1 is added to the retention determination counter. In the $n+8^{th}$ frame, since the current (overall phase difference) direction determination result is "in-focus", the final (overall phase difference) direction determination result is immediately made "in-focus".

Here, the previously described valid defocus amount will be described simply. As was described previously, valid defocus amount is defocus amount at the time that (overall phase difference) direction determination result is valid, specifically, at the time the final (overall phase difference) direction determination result becomes other than "retain" (for example, close range, infinity, or in-focus) (refer to S69 and S70 in FIG. 13). In a case where (overall phase difference) direction determination result is "retain", the previous valid defocus amount is maintained without updating valid defocus amount (refer to n, n+1, n+2, n+6, n+7, n+8 in FIG. 12). It should be noted that defocus amount is made a value that was selected in the defocus amount selection processing of step S25 (refer to FIG. 5).

Valid defocus amount is referenced when performing contrast AF, at the time that (overall phase difference) direction determination result is "retained". Specifically, when (overall phase difference) direction determination result is "retain" and a value for valid defocus amount is small, in other words, at the time that (overall phase difference) direction determination result is not stable in the vicinity of being in focus, lens drive is restricted. Conversely, when a value for valid defocus amount is large, in other words, at the time the subject is quite out of focus, then lens drive is performed and followability ensured even if the (overall phase difference) direction determination is retain. This is because in the vicinity of being in focus, lens drive drift is conspicuous in an image, but in a defocus state (blurred state) lens drive drift is not conspicuous in the image. Also, in the vicinity of in focus aggressive lens drive is not necessary because the subject is in focus, but in a defocus state it is more desirable to achieve focus quickly by performing lens drive.

Next, operation of the retention determination processing for overall phase difference direction determination, of step S43 (refer to FIG. 7) will be described using the flowchart shown in FIG. 13. From steps S51a to S67a, the flow of FIG. 13 is substantially the same as steps S51 to S67 for the retention determination processing for individual area phase difference direction determination processing that was shown in FIG. 9, and so detailed description will be omitted by adding a suffix "a" to corresponding step numbers. However, while in S51 of the flowchart of FIG. 9 determination is performed based on ranging results (direction determination result) using normal correlation calculation in step S33 (refer to FIG. 7), step S51a of the flowchart of FIG. 13 differs in that determination is performed based on an overall phase difference direction determination result of overall phase difference direction determination processing of step S41 (refer to FIG. 7, FIG. 11A and FIG. 11B). Also, the retention determination counter of step S57a is different to the retention determination counter that was set in steps S53 and S55 for the individual area phase difference direction determination and retention determination processing (refer to FIG. 9), and uses a retention determination counter for overall phase difference direction determination. Also, the counter threshold value may be the same value as the counter threshold value that was set in step S57 of the individual area phase difference direction determination and retention determination processing (refer to FIG. 9), and a counter threshold value for retention determination for overall phase difference direction determination may be set separately as a different value.

If a (final overall phase difference) direction determination result is determined in steps S63a, S65a and S67a, it is next determined whether or not a final overall phase difference direction determination result is "retain" (S69). Here, determination is based on a final overall phase difference direction determination result that was determined in steps S63a, S65a and S67a. If a final overall phase difference direction determination result was determined to be "retained" in step S67a, determination in step 69 is Yes.

If the result of determination in step S69 is that the final overall phase difference direction determination result is not "retain", the valid defocus amount is updated (S70). Here, defocus amount that has been calculated by the AF control circuit 12 this time is updated as current defocus amount. With the example that was shown in FIG. 12, this corresponds to frames n+3, n+4 and n+5.

On the other hand, if the result of determination in step S69 is that the final overall phase difference direction determination result is "retain", update of valid defocus amount is not performed. Since phase difference direction is not yet stable, valid defocus amount is not updated. With the example that was shown in FIG. 12, this corresponds to frames n+1, n+2, n+6, n+7 and n+8. If the result of determination in step S69 is Yes, or if valid defocus amount it is updated in step S70, the originating flow is returned to.

Here, a relationship between counter threshold value TH and AF drive will be described. The larger a value of the counter threshold value TH that is set, the later a time when the phase difference ranging result is reflected in lens drive becomes. However, if the count value of the retention determination counter exceeds the threshold value TH once, the phase difference ranging result is immediately reflected in lens drive. This means that the effect of the size of the counter threshold value TH on AF drive is only seen at the time AF drive is in operation. Also, only when the phase difference direction determination result is "in-focus", the phase difference ranging result is immediately reflected in lens drive regardless of the counter threshold value TH. If the determination result is not reflected, in a case where the counter threshold value TH is large an in-focus position will be passed, and there is possibility that it will not be possible to achieve focus.

In this way, in retention determination processing for overall phase difference direction determination, the valid defocus amount is not updated in the event that the determination result of the final overall phase difference direction determination (refer to FIG. 10 to FIG. 11B) becomes "retain", while the valid defocus amount is updated if the determination result is other than "retain". The final overall phase difference direction determination result becoming "retain" is a case where close range, infinity or indeterminate have been determined spanning a specified number of times, and the situation is not stable. If a final overall phase difference direction determination result becomes stable, then since the valid defocus amount is updated it is possible to perform AF with a defocus amount in the latest stabilized state, even if there is an unstable state such as where the subject is moving, and it is possible to reconcile focus stability and followability. Focus state is stabilized and it is possible to prevent an image becoming visually unappealing.

Next, the defocus amount selection of step S25 (refer to FIG. 5) will be described using FIG. 14. As was described previously, defocus amount is calculated in individual areas within the first focus detection area 31 (area for normal correlation calculation). This defocus amount selection of step S25 is performing selection of a single defocus amount from among a plurality of defocus amounts corresponding to individual areas that have been calculated using normal correlation calculation.

FIG. 14 shows an example of defocus amount that has been calculated using normal correlation calculation. With the example shown in FIG. 14, defocus amounts of 100 mm, −50 mm, −75 mm etc. have been calculated for eight individual areas, and ranging is not possible in one of the individual areas. With this embodiment, within the defocus amounts for each individual area, the defocus amount representing the closest is selected as a defocus amount that has been calculated using phase difference computational processing. For extended correlation calculation, with this embodiment only a single focus detection area is provided, and so selection is not performed. It goes without saying that in the event that there are a plurality of detection areas for extended correlation calculation, a defocus amount is selected. It should be noted that if ranging is not possible in all of the focus detection areas, a predetermined value is set to indicate that ranging is not possible.

In this way, in the defocus amount selection, an imaging plane is divided into a plurality of areas, and in a case where defocus amount has been calculated for each of the focus detection areas that have been divided, a defocus amount that corresponds to the closest distance (143 mm in FIG. 14) is selected. This is because generally, the closest subject is often the main subject.

Next, the hybrid direction determination of step S5 (refer to FIG. 4) will be described using FIG. 15. In the step phase 41 (refer to FIG. 3), two types of AF detection, namely contrast AF computational processing (refer to S1 in FIG. 4) and phase difference computational processing (refer to S3 in FIG. 4) are performed. With hybrid direction determination, direction for lens drive is finally determined using results for the two types of AF detection, namely contrast AF and phase difference AF.

As will be understood from FIG. 15, if a direction determination result (final overall phase difference direction determination result) using phase difference AF is "close range" or "infinity", the result "close range" or "infinity" is adopted regardless of a direction determination result using contrast AF. Specifically, although direction determination result for phase difference AF (final overall phase difference direction determination result) is prioritized, if a direction determination result for phase difference AF is not close range or infinity, a direction determination result using contrast AF is used. It should be noted that "else" in FIG. 15 is a case of "in focus", "indeterminate", or "retain". However, "in-focus" and "retain" are used (refer to S121 and S123) at the time of respective lens drive processing (refer to FIG. 17).

In this way, with the hybrid direction determination lens drive direction in the step phase 41 is determined using direction determination results for phase difference AF and contrast AF. Also, when performing this determination, direction determination result for phase difference AF are prioritized, and direction determination results for contrast AF are secondary. This means that even in a case where it is not possible to confirm drive direction using phase difference AF, it is possible to use contrast AF results, and so it is possible to perform stabilize control even with scenes for which phase difference AF is difficult.

Figure 16:
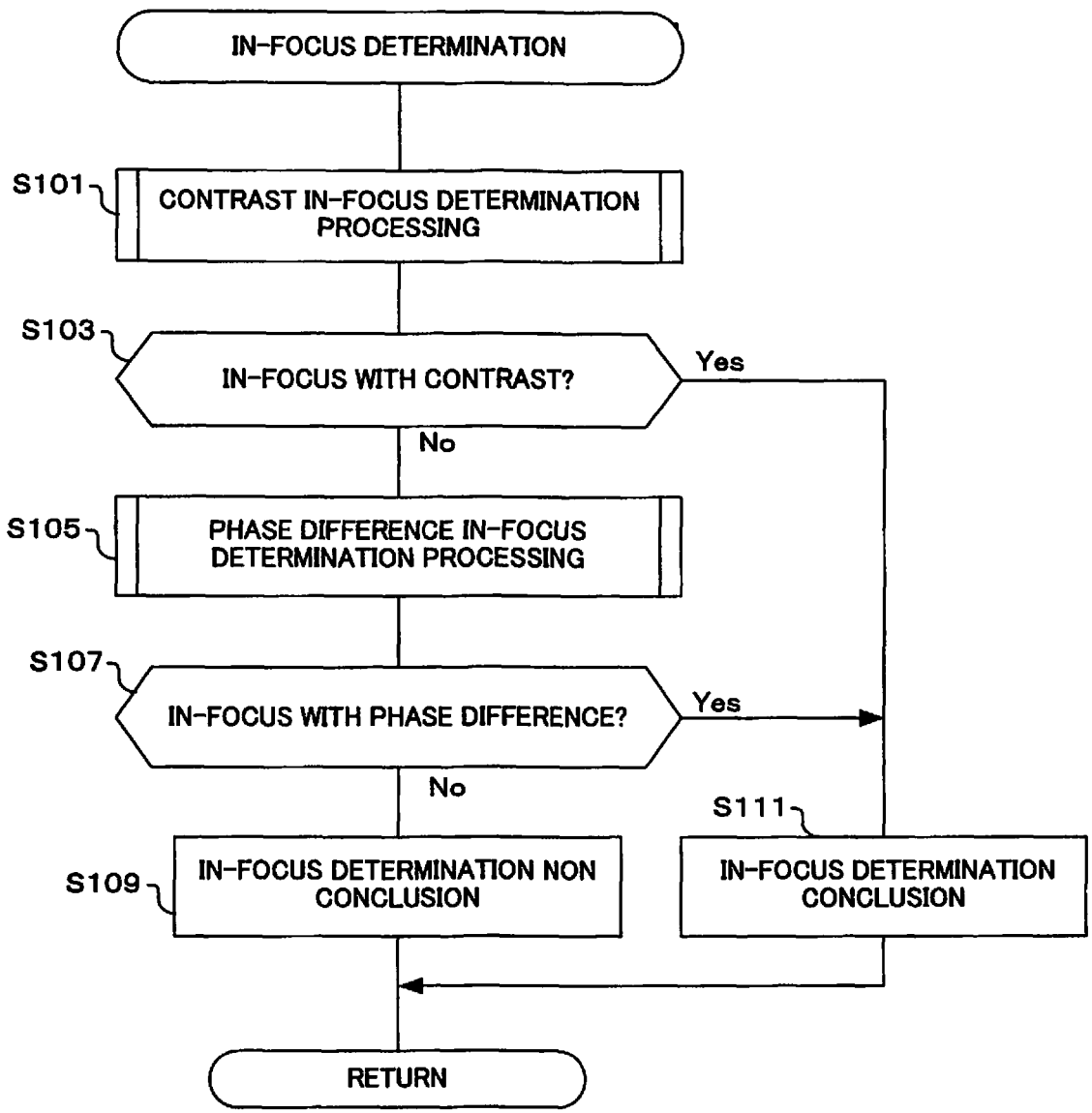
FIG. 16 is a flowchart showing operation of in-focus determination, in the camera of one embodiment of the present invention.

Next, detailed operation of the in-focus determination in step S7 (refer to FIG. 4) will be described using the flowchart shown in FIG. 16. As was described previously, this flowchart performs determination as to whether or not the subject is in focus, using contrast AF and phase difference AF.

If the flow for focus determination is commenced, first, contrast focus determination processing is executed (S101). Here, it is determined whether a result of contrast AF computational processing that was performed in step S1 is that a contrast value (focus evaluation value) has reached a peak. For example, it may be determined whether or not a current position is within a range of ±1Fδ of an in-focus point, using contrast values of three points that are close to a peak. It is next determined whether or not there is focus using contrast (S103). Here, determination as to whether or not there is focus is based on the determination of step S101.

If the result of determination in step S103 is not in focus, phase difference focus determination processing is performed (S105). Here, it is determined whether or not defocus amount is in a range that can be considered to be in-focus, based on the phase difference computational processing that was performed in step S3. It is next determined whether or not there is focus based on phase difference (S107). Here, determination as to whether or not there is focus is based on the determination of step S105.

If the phase difference focus determination of step S105 is that the phase difference direction determination result is in focus without any disturbance, in-focus is set. Specifically, determination conditions are made an AND condition of (A-i) and (A-ii) below.

(A-i) Phase Difference Direction Determination Result is "in-Focus" (Refer to S63a in FIG. 13).

(A-ii) there is No Disturbance.

The expression disturbance here represents deliberate movement of the camera such as panning or tilting, unintentional movement of the camera such as camera shake, and instability of face detection information etc. Camera movement is acquired by the gyro sensor circuit 9, and face detection information is acquired by the facial recognition circuit 15. There may also be determination of movement vectors calculated based on image data that is been acquired, and whether or not there is a zoom operation etc.

If the determination result of steps S103 or S107 is Yes, in-focus determination is established. On the other hand if the determination result in step S107 is No, in-focus determination is not established (S109). If the determinations of steps S109 or S111 have been performed, the originating processing flow is returned to.

In this way, in the flow for in-focus determination, if in-focus it is determined with at least one of results of in-focus determination using contrast AF, and in-focus determination using phase difference AF, it is then determined that it is in focus overall (focus detection device). In the case of movie AF, driving the focus lens is not preferred due to frequent focusing. In the case of in-focus with either method, if in-focus is determined for the overall (focus detection device), practical focus precision is ensured, while being able to prevent frequent focus lens drive. It should be noted that in FIG. 16 determination for contrast AF is performed first, but determination for phase difference AF may be performed first.

Next, detailed operation of the lens drive processing in step S9 (refer to FIG. 4) will be described using the flowchart shown in FIG. 17. This flow sets step drive amount for the step phase 41 in accordance with defocus amount.

If the flow for lens drive processing is commenced, it is first determined whether or not phase difference direction determination (final overall phase difference direction determination result) is in-focus (S121). Here, determination is based on whether or not final overall phase difference direction determination result in the retention determination processing (refer to FIG. 13) for overall phase difference direction determination is "in-focus". If the result of this determination is "in-focus", it is determined that there will be no lens drive (S129). During disturbance generation etc. there is in focus with respect to ranging data, but when it is not desired to establish in-focus determination this is valid.

If the result of determination in step S121 is not in-focus, it is determined whether or not a phase difference direction determination (final overall phase difference direction determination result) is retain (S123). Here, determination is based on whether or not final overall phase difference direction determination result in the retention determination processing (refer to FIG. 13) for overall phase difference direction determination is "retain". Specifically, the retention determination of the phase difference direction determination determines "retain" when an AND condition of (B-i) and (B-ii) below is satisfied.

(B-i) Final Overall Phase Difference Direction Determination Result is "Retain".

(B-ii) Absolute Value of Valid Defocus Amount is Smaller than 10Fδ.

The phase difference direction determination (final overall phase difference direction determination result) used in step S123 is kept at "retain" until an overall phase difference direction determination result is the same direction continuously for a specified number of times or more (refer to S67a in FIG. 13). If a final overall phase difference direction determination result is "retain" (B-i), valid defocus amount is referenced (refer to S70 in FIG. 13), and if, based on the valid defocus amount, in-focus is nearby (absolute value of valid defocus amount is smaller than 10Fδ) (B-ii), step drive is not performed (step drive amount is not calculated). Not performing drive close to in-focus is because it is easy for focus drift to become noticeable in this area. On the other hand, focus drift is not conspicuous in a defocus state, and even if focus may appear to be drifting it is better to prioritize focusing, and so step drive is not restricted.

Accordingly, in a case where the result of determination in step S123 was that a final overall phase difference direction determination result was retain, lens drive is not performed (S129). On the other hand, if the result of determination in step S123 is that the final overall phase difference direction determination result was not retain, step drive amount using phase difference is calculated (S125). Here, step drive amount is determined in accordance with defocus amount that was measured using phase difference computational processing and selected in the defocus amount selection processing (refer to S25 in FIG. 5, and to FIG. 14). Calculation of this step drive amount will be described later using FIG. 18.

If step drive amount has been calculated in step S125, lens drive is implemented (S127). In this step, the focus lens is driven by the step drive amount that was calculated in step S125, in the drive direction that was determined in the phase difference direction determination result close to an in-focus point, in the step phase 41 (refer to FIG. 3)

If the lens drive has been implemented in step S127, or if it is determined not to perform lens drive in step S129, the originating flow is returned to.

In this flow for lens drive processing, if a final overall phase difference direction determination result is in-focus or retain, lens drive is not performed (S129), while if a final overall phase difference direction determination result is not in-focus or retain, step drive amount corresponding to defocus amount is determined, and step drive is performed (S125, S127). As a result, at the time of movie shooting etc. it is possible to prevent focus appearing unsteady.

Next, calculation of step drive amount using phase difference, in step S125, will be described using FIG. 18. In FIG. 18, the normal correlation ranging result column shows defocus amount that has been selected from among a plurality of defocus amounts that have been calculated for every individual area within the first focus detection area 31 (refer to FIG. 2) (refer to S3 in FIG. 4, S25 in FIG. 5, and FIG. 14). Also, the determination using contrast column is determination based on a contrast value (focus evaluation value) that has been calculated from signals of image pixels within the third focus detection area 33 for contrast AF (refer to S1 in FIG. 4). Also, the extended correlation ranging result column is defocus amount that has been calculated from signals of focus detection pixels of the second focus detection area (refer to FIG. 2) (refer to S23 in FIG. 5, and S39 in FIG. 7). The step drive amount column shows drive amount of the focus lens calculated in step S125. Drive amount is represented by aperture F and a constant δ determined by pixel pitch. It should be noted that in the drawing, "–" means don't care, specifically, that it is not taken into account.

in FIG. 18, if state is C1, that is, if normal correlation ranging result is smaller than 5Fδ, step drive amount is made 0.5Fδ. In this case, since the normal correlation ranging result is smaller than 5Fδ, it is a region in which it appears to be sufficiently in focus for a movie. Therefore, lens drive to achieve focus may be carried out slowly.

If state is C2, that is, if normal correlation ranging result is larger than 5Fδ, step drive amount is made 2Fδ. In this case, it appears to be in focus to a certain degree as a movie, and focus does not need to be carried out too quickly. If state is C3, namely that normal correlation ranging result is larger than 10Fδ, step drive amount is made 4Fδ and focus is performed quickly.

In a case where it is not possible to obtain ranging result using normal correlation, it is examined whether or not the situation applies to states C4 to C8. If the result of this consideration is state C4, namely that ranging result using contrast AF is close to in focus, step drive amount is made 0.5Fδ. In this case, for normal correlation ranging is not possible, but determination using contrast AF is close to in focus, and in this state ranging result for contrast AF is trusted.

In a case where it is not possible to obtain ranging result using normal correlation and contrast AF, whether or not the situation applies to states C5 to C8 is considered. If the result of this consideration is state C5, namely that ranging result using extended correlation is within 5Fδ, step drive amount is made 1Fδ. In this case, ranging is not possible with normal correlation, but with a ranging result using extended correlation defocus amount is not large. Since there is a high possibility of being close to in focus, the step drive amount is restricted to 1Fδ.

Also, in the case of state C6, namely when a ranging result using extended correlation is larger than 5Fδ, step drive amount is made 4Fδ. In this case, ranging is not possible with normal correlation and defocus amount for extended correlation is large, and there is a high possibility that there is a quite out of focus state. In a quite out of focus state, step drive amount is made larger, and it is desired to ensure followability, and so 4Fδ is set as the step drive amount.

In a case where it is not possible to obtain ranging result using normal correlation, contrast AF, and extended correlation, whether or not the situation applies to states C7 and C8 is considered. If the result of this consideration is state C7, namely that a lens drive state is being continuously driven in one direction, the step drive amount is gradually increased from 4Fδ. In the event that ranging is not possible with normal correlation or with extended correlation, it is not possible to determine whether there is a quite out of focus state or if reliability is deficient. Therefore, in a case where the step drive is continuing in one direction based on a direction determination result using contrast AF, the step drive amount is gradually made larger.

If none of states C1 to C7 are applicable (state C8), step drive amount is set to 1Fδ. In this case, if direction determination using contrast AF is not continuously in one direction in state C7, there is a possibility of going back and forth in the vicinity of in-focus. Therefore, step drive amount is restricted to 1Fδ.

In this way, in the calculation of step drive amount shown in FIG. 18, step drive amount is obtained using ranging results and determination results etc. in the order of normal correlation ranging result, determination result using contrast AF, extended correlation ranging result, and lens drive state. Since ranging results etc. such as for normal correlation, extended correlation and contrast AF, are being determined comprehensively, it is possible to perform focus control having high followability even for a subject that has movement. It should be noted that the step drive amounts shown in FIG. 18 is an example, and may be appropriately changed taking into consideration various conditions such as ranging precision of phase difference AF and contrast AF etc., and followability of the lens drive mechanism etc.

As has been described above, with one embodiment of the present invention there is an image sensor 7 that is capable of generating image signals and phase difference detection signals by receiving light flux that has passed through a photographing lens, a plurality of focus detection regions having at least some parts shared are provided in a region of the image sensor where light flux is received (refer, for example, to FIG. 2), and focus adjustment is executed based on the image signals and the phase difference detection signals (refer, for example, to FIG. 4). Then, a first focus direction is calculated using phase difference detection based on a phase difference detection signal from a first focus detection region among the plurality of focus detection regions (refer, for example, to S31 to S37 in FIG. 7), and a second focus direction is calculated using phase difference detection based on a phase difference detection signal from a second focus detection region among the plurality of focus detection regions, in which it is possible to detect a larger focus deviation amount than the first focus deviation amount (refer, for example, to S39 in FIG. 7). Focus direction in which to perform focus adjustment is determined based on the first focus direction and the second focus direction (refer, for example, to S5 in FIG. 4, and to FIG. 15). This means that it is possible to focus even on a subject that is nearest within a focus detection area, and it is possible to perform focus control having high followability even for a subject having movement. Specifically, since it is possible for the second focus detection region to detect a larger focus deviation amount than the first focus deviation amount, it is possible to detect focus deviation amount even in the case of a subject at a close-range side, and in a case where a subject has movement (also including the case where orientation of the camera 100 changes significantly) also, it is possible to detect focus deviation amount from a close-range side to a long distance side. Also, a third focus direction that is towards being in focus, may be calculated by calculating respective contrast information based on image signals of the first focus detection region and image signals of a third focus detection region that has at least part thereof shared with the second focus detection region (refer, for example, to S1 in FIG. 4). In this case, direction for focus adjustment may be determined based on the first focus direction, second focus direction, and third focus direction.

It should be noted that a camera of one embodiment of the present invention is provided with a combination of contrast AF and phase difference AF, but contrast AF may be omitted. In this case, determination of focus direction may be performed with only focus detection signals from the first focus detection area 31 and the second focus detection area 32.

It should be noted that with the one embodiment of the present invention the AF control circuit 12, AE control circuit 13, image processing circuit 14, facial recognition circuit 15, and movie storage circuit 16 have been configured integrally with the system controller 10, but the system controller 10 may also be configured separately. It is also possible for some or all of the above described sections to be realized by software using the CPU 11, and to have a hardware structure such as gate circuits that have been generated based on a programming language that is described using Verilog, and also to use a hardware structure that utilizes software such as a DSP (digital signal processor). Suitable combinations of these approaches may also be used. Also, functions being implemented using the CPU 11 and programs may also be implemented using hardware circuits, and may also be implemented using Verilog, a DSP etc.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a microscope, a camera for mounting on a vehicle, a surveillance camera etc. In any event, it is possible to adopt the present invention as long as a device carries out focus control.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus control device, comprising:
   an image sensor capable of generating image signals and phase difference detection signals by receiving light flux that passes through a photographing lens;
   a focus detection region setting circuit that sets a plurality of focus detection regions having at least some parts in common, in a region of the image sensor that receives the light flux;
   an AF control circuit comprising a first calculation section that calculates a first focus direction using phase difference detection based on a phase difference detection signal from a first focus detection region among the plurality of focus detection regions, and a second calculation section that is capable of detecting a larger focus deviation amount than a focus deviation amount that can be detected by the first calculation section, and calculates a second focus direction using phase difference detection based on a phase difference detection signal from a second focus detection region among the plurality of focus detection regions; and a controller that determines focus direction in which to perform focus adjustment based on the first focus direction and the second focus direction.

2. The focus control device of claim 1, wherein:

the focus detection region setting circuit sets a plurality of individual areas within the first focus detection region;

the first calculation section respectively detects focus direction for each of the plurality of individual areas within the first focus detection region, and if first focus directions that have been respectively calculated in time series for each of the plurality of individual areas continue to be the same for a specified number of times, determines that the first focus directions are the same direction, and otherwise, if the first focus directions are not continuously the same for the specified number of times, determines that ranging is not possible;

the second calculation section determines focus direction of the second focus detection region; and the controller determines a focus direction in which to perform focus adjustment to be towards a close-range side if, for the plurality of individual areas within the first focus detection region, the close-range side is indicated within any one of the plurality of first focus directions that have been respectively calculated, and determines a focus direction in which to perform focus adjustment to be towards the close-range side if, with all of the plurality of the first focus directions not indicating close-range side, the second focus direction indicates the close-range side.

3. The focus control device of claim 2, wherein:

the controller does not perform the focus adjustment if all of the plurality of first focus direction do not indicate toward the close-range side, and in-focus is detected in any one individual area.

4. The focus control device of claim 2, wherein:

the controller determines focus direction in which to perform adjustment based on the second focus direction, in the event that all of the plurality of first focus directions indicate ranging impossible.

5. The focus control device of claim 2, wherein:

the AF control circuit has a third calculation section that calculates respective contrast information based on an image signal from the first focus detection region and an image signal from a third focus detection region that has at least part thereof common to the second focus detection region, to calculate a third focus direction that is heading towards being in focus; and the controller determines focus direction in which to perform focus adjustment based on the third focus direction, when all of the plurality of first focus directions indicate ranging not possible, and the second focus direction also indicates ranging not possible.

6. The focus control device of claim 2, wherein:

the controller is capable of setting the specified number of times.

7. The focus control device of claim 6, further comprising:

a user operation input member, and wherein the controller sets the specified number of times based on output of the user operation input member.

8. A focus control method for a focus control device that has an image sensor capable of generating image signals and phase difference detection signals by receiving light flux that has passed through a photographing lens, that sets a plurality of focus detection regions having at least some parts in common, in a region of the image sensor that receives the light flux, and executes focus adjustment based on the image signals and the phase difference detection signals, the focus control method comprising:

calculating a first focus direction by phase difference detection based on a phase difference detection signal from a first focus detection region among the plurality of focus detection regions;

calculating a second focus direction using phase difference detection based on a phase difference detection signal from a second focus detection region among the plurality of focus detection regions, it being possible, in the second focus detection region, to detect a larger focus deviation amount than a focus deviation amount that can be detected by phase difference detection based on the phase difference detection signal from the first focus detection region; and determining focus direction in which to perform focus adjustment based on the first focus direction and the second focus direction.

9. The focus control method of claim 8, further comprising:

setting a plurality of individual areas within the first focus detection region;

respectively detecting focus direction for each of the plurality of individual areas within the first focus detection region;

if first focus directions that have been respectively calculated in time series for each of the plurality of individual areas continue to be the same for a specified number of times, determining that the first focus directions are the same direction, and otherwise, if the first focus directions are not continuously the same for the specified number of times, determining that ranging is not possible;

determining focus direction of the second focus detection region; and determining a focus direction in which to perform focus adjustment to be towards a close-range side if, for the plurality of individual areas within the first focus detection region, the close-range side is indicated within any one of the plurality of first focus directions that have been respectively calculated, and determining a focus direction in which to perform focus adjustment to be towards the close-range side if, with all of the plurality of the first focus directions not indicating close-range side, the second focus direction indicates the close-range side.

10. The focus control method of claim 9, further comprising:

not performing the focus adjustment if all of the plurality of first focus direction do not indicate toward the close-range side, and in-focus is detected in any one individual area.

11. The focus control method of claim 9, further comprising:

determining focus direction in which to perform the adjustment based on the second focus direction, in the event that all of the plurality of first focus directions indicate ranging impossible.

12. The focus control method of claim 9, further comprising:

calculating respective contrast information based on an image signal from the first focus detection region and an image signal from a third focus detection region that has at least part thereof common to the second focus detection region, to calculate a third focus direction that is heading towards being in focus; and determining focus direction in which to perform the focus adjustment based on the third focus direction, when all of the plurality of first focus directions indicate ranging not possible, and the second focus direction also indicates ranging not possible.

13. The focus control method of claim 9, further comprising:

setting the specified number of times based on external input.

14. A non-transitory computer-readable medium storing a processor executable code, which when executed by at least one processor, performs a focus adjustment method, the processor being arranged within a focus control device that has an image sensor capable of generating an image signal and a phase difference detection signal by receiving light flux that has passed through a photographing lens, that sets a plurality of focus detection regions having at least some parts in common, in a region of the image sensor that receives the light flux, and executes focus adjustment based on the image signal and the phase difference detection signal, the focus adjustment method comprising:

calculating a first focus direction by phase difference detection based on a phase difference detection signal from a first focus detection region among the plurality of focus detection regions;

calculating a second focus direction using phase difference detection based on a phase difference detection signal from a second focus detection region among the plurality of focus detection regions it being possible, in the second focus detection region, to detect a larger focus deviation amount than a focus deviation amount that can be detected by phase difference detection based on the phase difference detection signal from the first focus detection region; and determining focus direction in which to perform focus adjustment based on the first focus direction and the second focus direction.

15. The storage medium of claim 14, wherein the focus control method further comprises:

setting a plurality of individual areas within the first focus detection region;

respectively detecting focus direction for each of the plurality of individual areas within the first focus detection region;

if first focus directions that have been respectively calculated in time series for each of the plurality of individual areas continue to be the same for a specified number of times, determining that the first focus directions are the same direction, and otherwise, if the first focus directions are not continuously the same for the specified number of times, determining that ranging is not possible;

determining focus direction of the second focus detection region; and determining a focus direction in which to perform focus adjustment to be towards a close-range side if, for the plurality of individual areas within the first focus detection region, the close-range side is indicated within any one of the plurality of first focus directions that have been respectively calculated, and determining a focus direction in which to perform focus adjustment to be towards the close-range side if, with all of the plurality of the first focus directions not indicating close-range side, the second focus direction indicates the close-range side.

16. The storage medium of claim 15, wherein the focus control method further comprises:

not performing the focus adjustment if all of the plurality of first focus direction do not indicate toward the close-range side, and in-focus is detected in any one individual area.

17. The storage medium of claim 15, wherein the focus control method further comprises:

determining focus direction in which to perform the adjustment based on the second focus direction, in the event that all of the plurality of first focus directions indicate ranging impossible.

18. The storage medium of claim 15, wherein the focus control method further comprises:

calculating respective contrast information based on an image signal from the first focus detection region and an image signal from a third focus detection region that has at least part thereof common to the second focus detection region, to calculate a third focus direction that is heading towards being in focus; and determining focus direction in which to perform the focus adjustment based on the third focus direction, when all of the plurality of first focus directions indicate ranging not possible, and the second focus direction also indicates ranging not possible.

19. The storage medium of claim 15, wherein the focus control method further comprises:

setting the specified number of times based on external input.

* * * * *